US012738474B2

(12) United States Patent
Fujii

(10) Patent No.: US 12,738,474 B2
(45) Date of Patent: Sep. 15, 2026

(54) APPARATUS FOR MANUFACTURING ELECTRODE ACTIVE MATERIAL LAYER

(71) Applicant: ZEON CORPORATION, Tokyo (JP)

(72) Inventor: Tsutomu Fujii, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 335 days.

(21) Appl. No.: 18/710,612

(22) PCT Filed: Dec. 1, 2022

(86) PCT No.: PCT/JP2022/044348
§ 371 (c)(1),
(2) Date: May 16, 2024

(87) PCT Pub. No.: WO2023/100973
PCT Pub. Date: Jun. 8, 2023

(65) Prior Publication Data

US 2025/0018419 A1 Jan. 16, 2025

(30) Foreign Application Priority Data

Dec. 3, 2021 (JP) ................................ 2021-197315

(51) Int. Cl.
*H01M 4/04* (2006.01)
*B05C 5/02* (2006.01)
(Continued)

(52) U.S. Cl.
CPC ......... *H01M 4/0435* (2013.01); *B05C 5/0245* (2013.01); *B05C 11/025* (2013.01); *H01M 4/0404* (2013.01)

(58) Field of Classification Search
CPC .. H01M 4/0435; H01M 4/0404; B05C 1/0813
See application file for complete search history.

(56) References Cited

U.S. PATENT DOCUMENTS 10,084,179 B2 * 9/2018 Tanihara .................. B05C 9/04
10,396,350 B2 * 8/2019 Hosono .............. H01M 4/0469
(Continued)

FOREIGN PATENT DOCUMENTS

JP H03161314 A 7/1991
JP H09245776 A 9/1997
(Continued)

OTHER PUBLICATIONS

Oct. 31, 2025, the Extended European Search Report issued by the European Patent Office in the corresponding European Patent Application No. 22901403.0.

(Continued)

*Primary Examiner* — Atul P. Khare
(74) *Attorney, Agent, or Firm* — KENJA IP LAW PC

(57) ABSTRACT

A production apparatus of an electrode active material layer, comprising: a support unit; a feeding unit feeding prescribed granulated particles on or above the support unit; a first conveying unit; a squeegee unit; a first stock guide; a second stock guide; a first position measurement unit; a second position measurement unit; a rolling unit; a first gap adjustment unit; a second gap adjustment unit; and a control unit. The first position measurement unit measures a distance D1. The second position measurement unit measures a distance D2. The control unit causes the first gap adjustment unit to adjust a gap G1 based on a difference between the gap G1 obtained based on the distance D1 and a gap threshold T1 and causes the second gap adjustment unit to adjust a gap G2 based on a difference between the gap G2 obtained based on the distance D2 and a gap threshold T2.

6 Claims, 12 Drawing Sheets

(51) Int. Cl.
*B05C 11/02* (2006.01)
*H01M 4/02* (2006.01)

(56) References Cited

U.S. PATENT DOCUMENTS

| | | | |
|---|---|---|---|
| 2017/0179465 | A1 | 6/2017 | Torita et al. |
| 2017/0256781 | A1 | 9/2017 | Suzuki et al. |

FOREIGN PATENT DOCUMENTS

| | | | | |
|---|---|---|---|---|
| JP | 2005139536 | A | | 6/2005 |
| JP | 2016018682 | A | | 2/2016 |
| JP | 2016025060 | A | | 2/2016 |
| JP | 2016062654 | A | | 4/2016 |
| JP | 2016100067 | A | | 5/2016 |
| JP | 2016100161 | A | * | 5/2016 |
| JP | 2016115432 | A | | 6/2016 |
| JP | 2016115569 | A | | 6/2016 |
| JP | 2019029308 | A | * | 2/2019 |
| JP | 2019075244 | A | * | 5/2019 |

OTHER PUBLICATIONS

May 2, 2024, International Preliminary Report on Patentability issued in the International Patent Application No. PCT/JP2022/044348.

Feb. 14, 2023, International Search Report issued in the International Patent Application No. PCT/JP2022/044348.

* cited by examiner

FIG.1
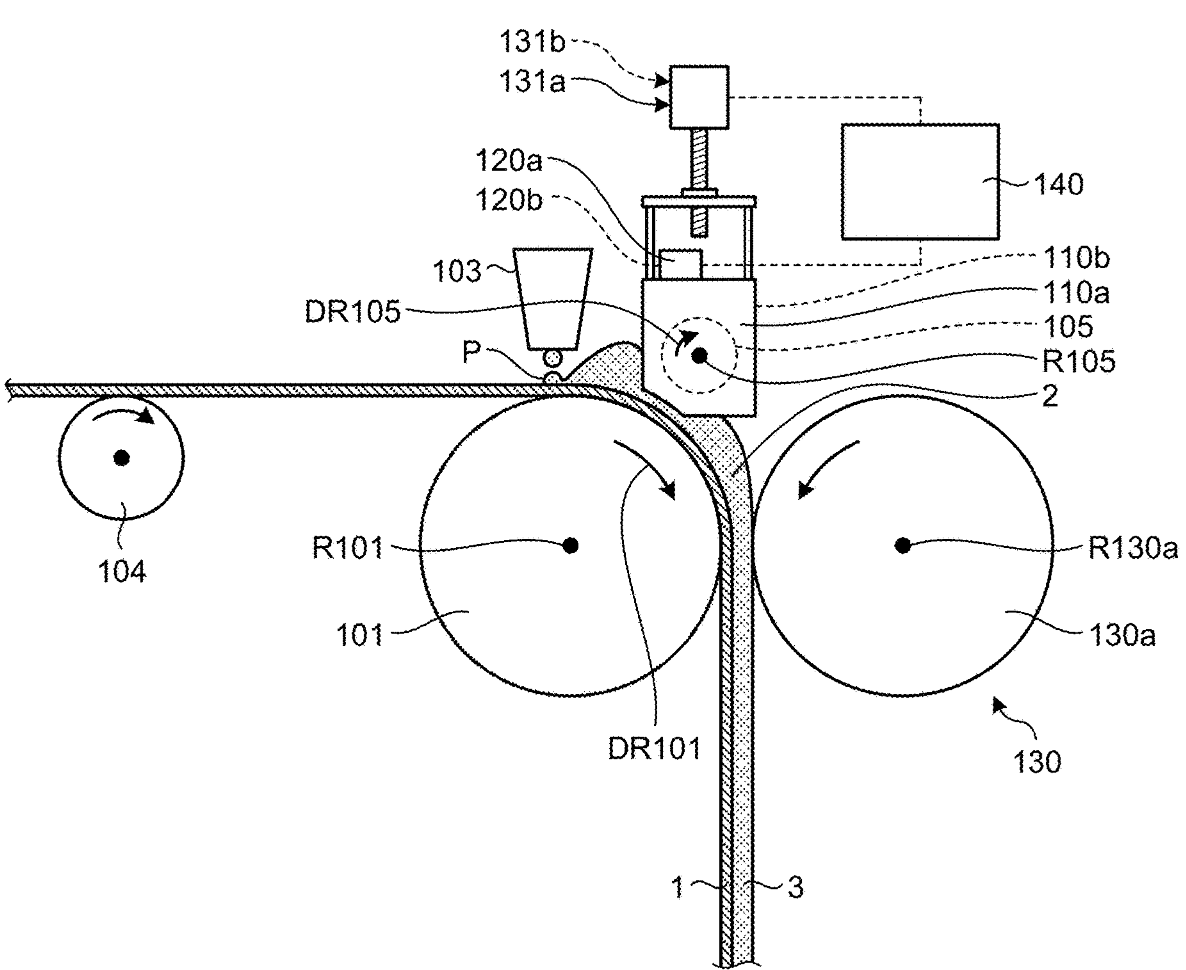

FIG.7

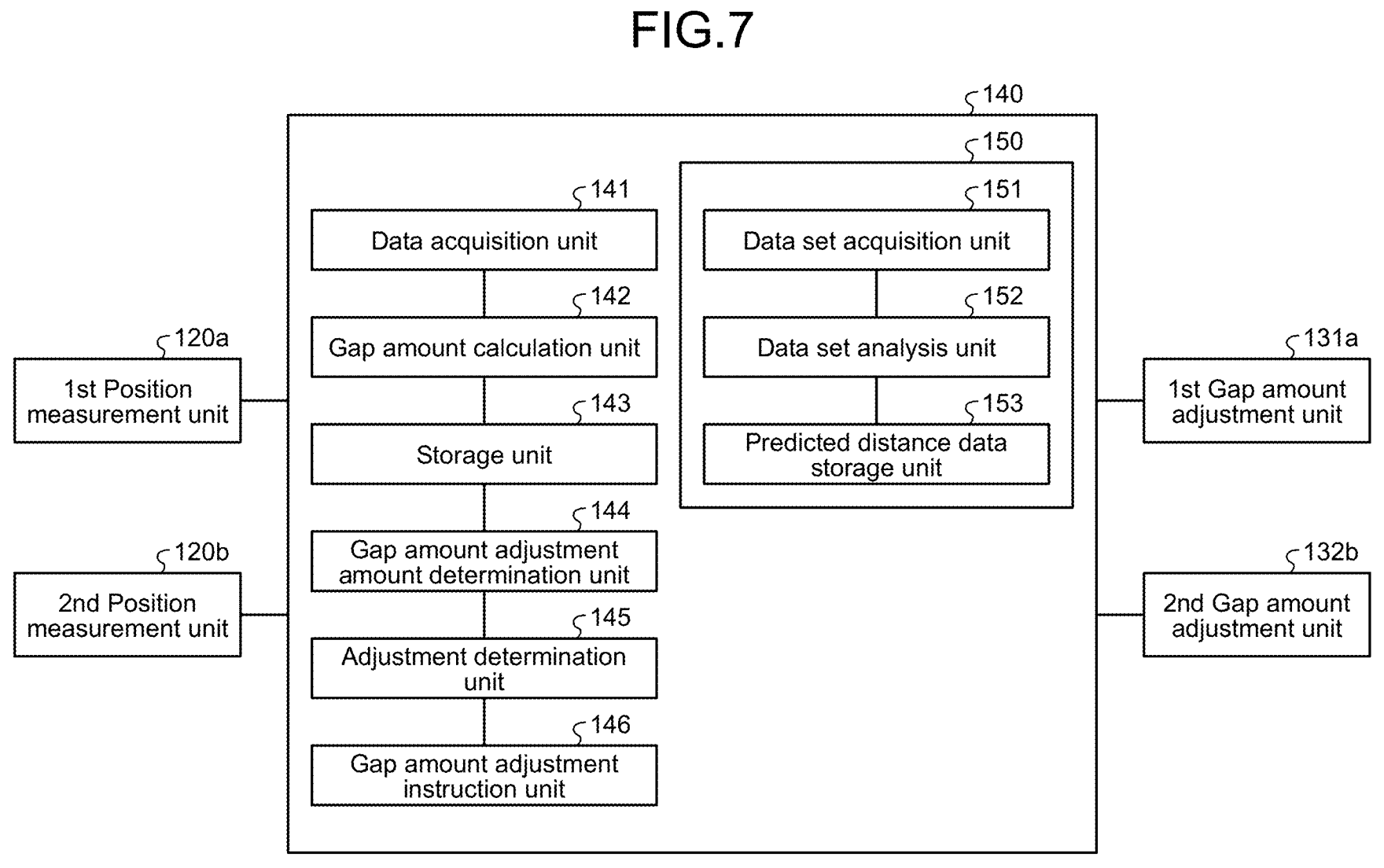

140
150
151 Data set acquisition unit
152 Data set analysis unit
153 Predicted distance data storage unit
141 Data acquisition unit
142 Gap amount calculation unit
143 Storage unit
144 Gap amount adjustment amount determination unit
145 Adjustment determination unit
146 Gap amount adjustment instruction unit
131a 1st Gap amount adjustment unit
132b 2nd Gap amount adjustment unit
120a 1st Position measurement unit
120b 2nd Position measurement unit

FIG.10
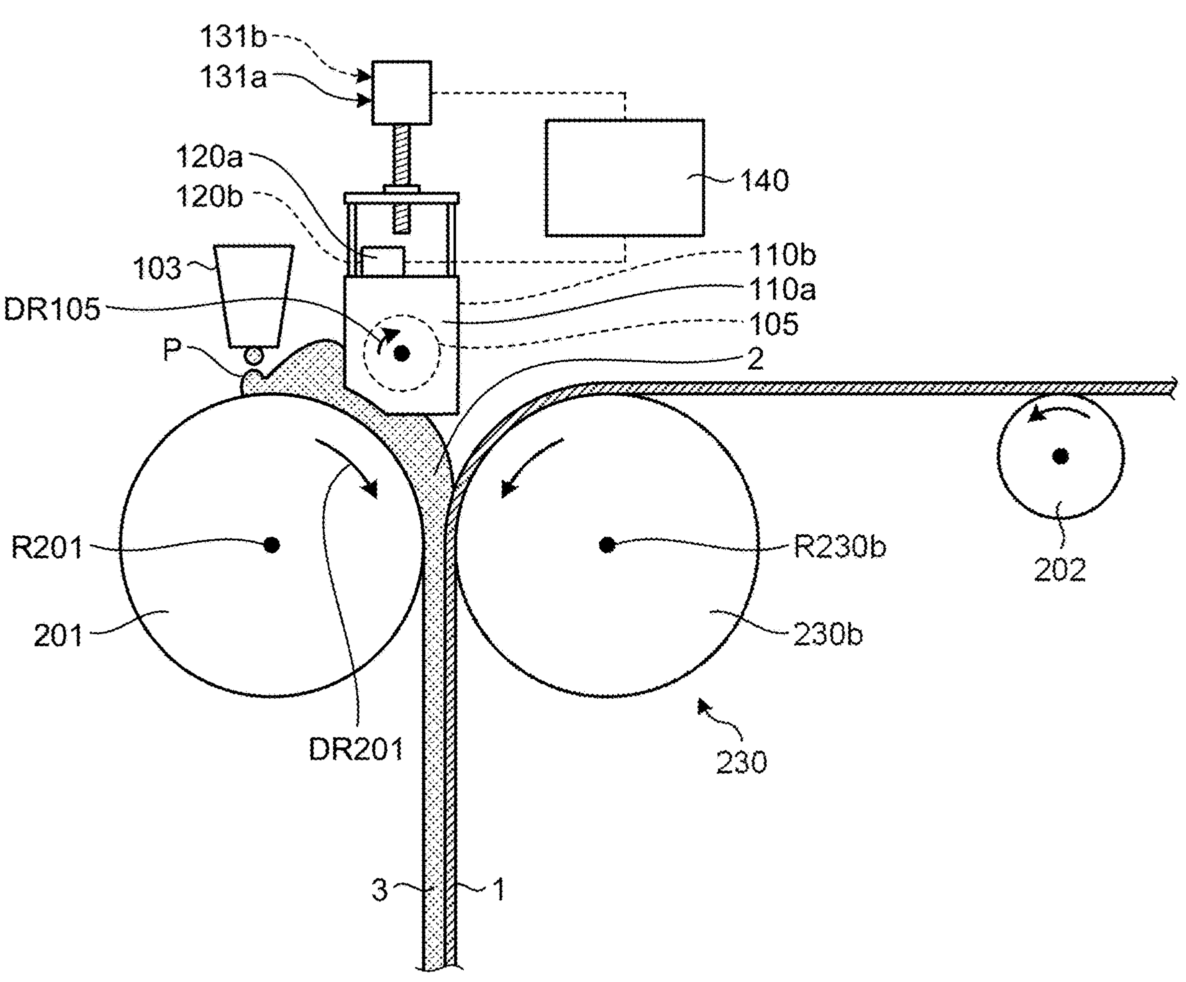

APPARATUS FOR MANUFACTURING ELECTRODE ACTIVE MATERIAL LAYER

TECHNICAL FIELD

The present invention relates to a production apparatus of an electrode active material layer.

BACKGROUND ART

Electrode sheets, which are components of batteries such as a lithium ion rechargeable battery, can include an electrode active material layer. The electrode active material layer is usually formed on a substrate that is a current collector. As an apparatus for forming an electrode active material layer, an apparatus that deposits granulated particles containing an electrode active material as a layer on a substrate and rolls the layer of the granulated particles has been known. To uniformize the thickness of the granulated particle layer, the production apparatus of an electrode active material layer includes a member (squeegee unit) that levels the granulated particles deposited on the widthwise midsection of the granulated particle layer and guides the granulated particles to both widthwise end portions. Techniques for reducing the conveyance of the granulated particles guided to both widthwise end portions beyond the specified width of the granulated particle layer downstream in the conveyance direction of the granulated particle layer have been known (see Patent Literatures 1 to 4).

CITATION LIST

Patent Literature

Patent Literature 1: Japanese Patent Application Laid-Open No. 2016-100067 A

Patent Literature 2: Japanese Patent Application Laid-Open No. 2016-115432 A

Patent Literature 3: Japanese Patent Application Laid-Open No. 2016-018682 A (Corresponding foreign publication: U.S. Patent Application Publication No. 2017/179465)

Patent Literature 4: Japanese Patent Application Laid-Open No. 2016-115569 A

SUMMARY OF THE INVENTION

Technical Problem

The granulated particles that are leveled and guided to both widthwise end portions of the granulated particle layer by the squeegee unit may possibly go beyond both widthwise end portions of the squeegee unit and may be conveyed downstream depending on the production conditions, such as when the amount of granulated particles fed is excessive. The excess granulated particles that have been conveyed downstream can get into a rolling unit such as a rolling roll and cause defective formation of the electrode active material layer.

To remove the excess granulated particles that have been conveyed downstream, a production apparatus of Patent Literature 1 includes jigs and a dust suction device for removing both end portions of the granulated particle layer formed beyond a specified width. A production apparatus of Patent Literature 2 includes an air purge device for removing both end portions of the granulated particle layer by blowing gas.

However, the production apparatus of Patent Literature 1 and the production apparatus of Patent Literature 2 may have difficulty in stably producing an electrode active material layer because of excess granulated particles conveyed downstream beyond both widthwise end portions of the squeegee unit. In addition, the occurrence of excess granulated particles increases production costs.

Production apparatuses of Patent Literatures 3 and 4 include guide members for forming areas where granulated particles are not deposited. However, such guide members physically contact the surface where the granulated particles are deposited. If, for example, the granulated particles are deposited on the substrate, and the relative positions of the substrate and the guide members in the width direction vary due to factors such as tension fluctuations during substrate conveyance, the substrate can therefore be distorted and break. If, for example, the granulated particles are directly deposited on a support unit such as a roll, the guide members wear due to the contact of the support unit and the guide members. In such a case, the guide units can fail to serve their function because of the increased gaps between the substrate area and the guide units.

As a result, it has sometimes been difficult to stably produce the electrode active material layer.

A production apparatus capable of stably producing an electrode active material layer is thus desired.

Solution to Problem

The inventor has made an intensive study to solve the foregoing problem, and as a result found that the problem can be solved by a production apparatus including certain stock guides and a certain control unit, and completed the present invention.

More specifically, the present invention provides the following.

<1> A production apparatus of an electrode active material layer, comprising:

a support unit;

a feeding unit that feeds granulated particles on or above the support unit, the granulated particles containing an electrode active material and a binder;

a first conveying unit that conveys the granulated particles that have been fed on or above the support unit;

a squeegee unit that levels the granulated particles which are conveyed to form a granulated particle layer;

a first stock guide having a plate shape, the first stock guide having a first surface facing the support unit, the first stock guide being disposed in parallel with a first end face of the squeegee unit;

a second stock guide having a plate shape, the second stock guide having a second surface facing the support unit, the second stock guide being disposed in parallel with a second end face of the squeegee unit; and a rolling unit that rolls the granulated particle layer to form an electrode active material layer, wherein:

the production apparatus further comprises a first position measurement unit fixed to the first stock guide, a second position measurement unit fixed to the second stock guide, a first gap amount adjustment unit, a second gap amount adjustment unit, and a control unit;

the first stock guide and the second stock guide are disposed so that a distance between a main surface of the first stock guide and a main surface of the second stock guide is equivalent to a width of the electrode active material layer;

the first position measurement unit is capable of measuring a distance D1 between the first position measurement unit and a surface that faces the first surface of the first stock guide and to which the granulated particles are fed;

the second position measurement unit is capable of measuring a distance D2 between the second position measurement unit and a surface that faces the second surface of the second stock guide and to which the granulated particles are fed;

the first gap amount adjustment unit is capable of adjusting a gap amount G1 between the first surface of the first stock guide and the surface to which the granulated particles are fed;

the second gap amount adjustment unit is capable of adjusting a gap amount G2 between the second surface of the second stock guide and the surface to which the granulated particles are fed;

the control unit causes the first gap amount adjustment unit to adjust the gap amount G1 based on a difference between the gap amount G1 obtained based on the distance D1 and a gap amount threshold T1 that has been set to be greater than 0 μm; and the control unit causes the second gap amount adjustment unit to adjust the gap amount G2 based on a difference between the gap amount G2 obtained based on the distance D2 and a gap amount threshold T2 that has been set to be greater than 0 μm.

<2> The production apparatus of an electrode active material layer according to <1>, wherein:

the first position measurement unit is fixed to a first end face of the first stock guide opposite to the first surface of the first stock guide;

the first stock guide has a first through-hole that runs through from the first end face of the first stock guide, to which the first position measurement unit is fixed, to the first surface;

the first position measurement unit is configured to be capable of measuring the distance D1 through the first through-hole;

the second position measurement unit is fixed to a second end face of the second stock guide opposite to the second surface of the second stock guide;

the second stock guide has a second through-hole that runs through from the second end face of the second stock guide, to which the second position measurement unit is fixed, to the second surface; and the second position measurement unit is configured to be capable of measuring the distance D2 through the second through-hole.

<3> The production apparatus of an electrode active material layer according to <1> or <2>, further comprising a second conveying unit that conveys a substrate to the rolling unit, wherein the rolling unit rolls the granulated particle layer that has been overlaid on the conveyed substrate.

<4> The production apparatus of an electrode active material layer according to <1> or <2>, further comprising a third conveying unit that conveys a substrate to the support unit, wherein:

the support unit supports the substrate;

the feeding unit feeds the granulated particles on the substrate that has been supported by the support unit;

the first position measurement unit is configured to be capable of measuring the distance D1 between the first position measurement unit and a main surface of the substrate that faces the first surface of the first stock guide;

the second position measurement unit is configured to be capable of measuring the distance D2 between the second position measurement unit and a main surface of the substrate that faces the second surface of the second stock guide;

the control unit obtains the gap amount G1 based on the distance D1 and causes the first gap amount adjustment unit to adjust the gap amount G1 based on a difference between the gap amount G1 and the gap amount threshold T1 that has been set so that a distance between the first surface of the first stock guide and the main surface of the substrate becomes greater than 0 μm; and the control unit obtains the gap amount G2 based on the distance D2 and causes the second gap amount adjustment unit to adjust the gap amount G2 based on a difference between the gap amount G2 and the gap amount threshold T2 that has been set so that a distance between the second surface of the second stock guide and the main surface of the substrate becomes greater than 0 μm.

<5> The production apparatus of an electrode active material layer according to any one of <1> to <4>, wherein a single roll serves as the support unit and the first conveying unit.

<6> The production apparatus of an electrode active material layer according to any one of <1> to <5>, wherein:

the support unit is a rotatable roll;

the control unit acquires a data set A1 on the distance D1 during a period in which the support unit rotates two revolutions or more, analyzes the data set A1, predicts the distance D1, which varies depending on the rotation of the support unit, and causes the first gap amount adjustment unit to adjust the gap amount G1 based on the predicted distance D1; and the control unit acquires a data set A2 on the distance D2 during a period in which the support unit rotates two revolutions or more, analyzes the data set A2, predicts the distance D2, which varies depending on the rotation of the support unit, and causes the second gap amount adjustment unit to adjust the gap amount G2 based on the predicted distance D2.

Advantageous Effects of Invention

According to the present invention, a production apparatus of an electrode active material layer capable of stably producing an electrode active material layer can be provided.

BRIEF DESCRIPTION OF DRAWINGS

FIG. 1 is a schematic diagram illustrating a production apparatus of an electrode active material layer according to a first embodiment.

FIG. 7 is a schematic diagram illustrating a configuration of a control unit including a distance prediction unit according to the first embodiment.

FIG. 10 is a schematic diagram illustrating a production apparatus of an electrode active material layer according to a second embodiment.

DESCRIPTION OF EMBODIMENTS

Figure 2:
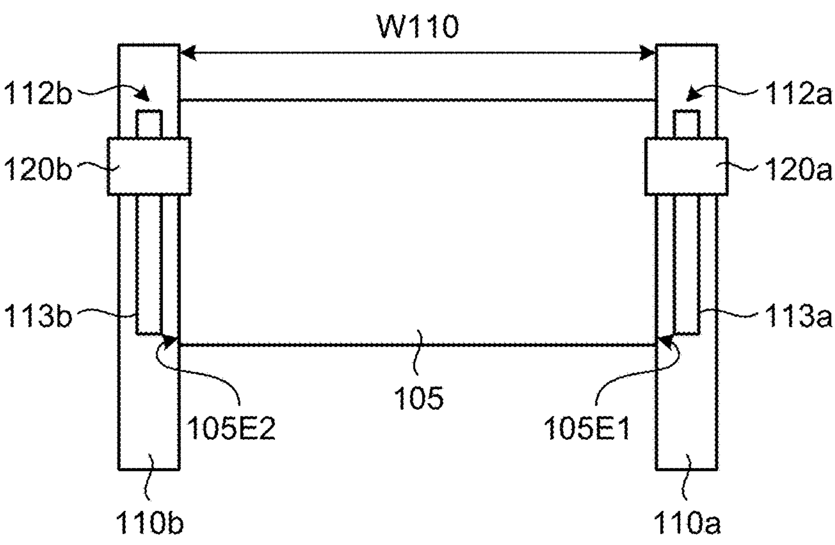
FIG. 2 is a top view schematically illustrating a part of the production apparatus according to the first embodiment.

Hereinafter, the present invention will be described in detail with reference to embodiments and examples. However, the present invention is not limited to embodiments and examples described below, and may be freely modified for implementation without departing from the scope of claims of the present invention and the scope of their equivalents. Components of embodiments described below may be combined as appropriate. In the drawings, the same components are denoted by the same reference numerals, and descriptions thereof may be omitted.

In the following description, a "long-length" film refers to a film with the length that is 5 times or more the width of the film, and preferably a film with the length that is 10 times or more the width thereof, and specifically refers to a film having a length that allows a film to be wound up into a rolled shape for storage or transportation. The upper limit of the length of a film relative to the width of the film may be, but not particularly limited to, for example, 100,000 times or less the width.

In the following description, a direction of an element being "parallel", "perpendicular" or "orthogonal" may allow an error within the range of not impairing the advantageous effects of the present invention, for example, within a range of +3°, +2°, or +1° unless otherwise specified.

In the following description, "on" or "above" an element covers a case where a direct contact is made with the element and a case where an indirect contact is made with the element.

An electrode active material layer produced by a production apparatus that is an embodiment of the present invention is obtained by rolling a layer of granulated particles. The electrode active material layer is preferably formed on a substrate. The substrate is preferably a long-length one.

Examples of the substrate may include: metal foils formed of aluminum, platinum, nickel, tantalum, titanium, stainless steel, copper, and other alloys; films containing electroconductive materials (such as carbon and electroconductive macromolecular materials); paper; fabric cloths formed of natural fibers, synthetic fibers, and the like; and resin films containing polymers. Examples of the polymers that can be contained in the resin films may include: a polyester such as polyethylene terephthalate and polyethylene naphthalate; a polyimide; a polypropylene; a polyphenylene sulfide; a polyvinyl chloride; an aramid; PEN; and PEEK. Such materials can be selected as appropriate depending on the intended purposes.

Among these, the preferable substrate may be a metal foil, a film containing a carbon material, and a film containing an electroconductive macromolecular material, more preferably a metal foil, and still more preferably a copper foil, an aluminum foil, and an aluminum alloy foil from the viewpoint of electroconductivity and withstand voltage. Such substrates are suitable for the production of electrode sheets for lithium ion batteries.

The substrate may be subjected to a surface treatment such as a coating film treatment, a punching process, a buffing process, a sand blasting process, or an etching process, or may be subjected to multiple surface treatments.

The thickness of the substrate is not particularly limited. The thickness is preferably 1 μm or more, and more preferably 5 μm or more, and is preferably 1000 μm or less, and more preferably 800 μm or less. The substrate may have any given width.

The granulated particles usually contain the electrode active material and a binder, and, as necessary, may contain optional components such as a dispersant, an electroconductive material, and an additive.

The electrode active material contained in the granulated particles may be a positive electrode active material or a negative electrode active material. Examples of the positive electrode active material and the negative electrode active material may include materials that can be used as an electrode active material for lithium ion batteries. Examples of the positive electrode active material may include a metal oxide that can be reversibly doped and undoped with lithium ions. Examples of such metal oxides may include lithium cobalt oxide ($LiCoO_2$), lithium nickel oxide (LiNiO), lithium manganese oxide ($LiMn_2O_4$), lithium iron phosphate ($LiFePO_4$), and ternary active materials obtained by substituting nickel and manganese for a part of lithium cobalt oxide (for example, $LiCo_{1/3}Ni_{1/3}Mn_{1/3}O_2$). As the positive electrode active material, one type thereof may be solely used, and two or more types thereof may also be used in combination.

Examples of the negative electrode active material may include: low crystallizable carbons (amorphous carbons) (e.g., easily graphitizable carbon, non-graphitizable carbon, and pyrolytic carbon); graphite (e.g., natural graphite and synthetic graphite); alloy-based materials containing tin, silicon, and the like; and oxides (e.g., silicon oxide, tin oxide, and lithium titanate). As the negative electrode active material, one type thereof may be solely used, and two or more types thereof may also be used in combination.

The electrode active material is preferably in a granular form. With the granular particle form, the electrode active material can be shaped into a high-density electrode.

The volume-average particle diameter (D50) of the electrode active material is preferably 0.1 μm or more and 100 μm or less, more preferably 0.3 μm or more and 50 μm or less, and still more preferably 0.5 μm or more and 30 μm or less. When the volume-average particle diameter (D50) of the electrode active material falls within the above-described range, the electrode active material can be suitably used as a material for a lithium ion battery electrode.

The binder contained in the granulated particles is preferably a compound capable of binding the electrode active materials to each other. The binder is more preferably a dispersive binder having a property of dispersing when in a solvent. Examples of the dispersive binder may include macromolecular compounds such as a silicon atom-containing polymer, a fluorine atom-containing polymer, a conjugated diene-based polymer, an acrylate-based polymer, a polyimide, a polyamide, and a polyurethane.

The shape of the dispersive binder is not particularly limited, and preferably particulate. A particulate dispersive binder can improve the binding property and can reduce a drop in the capacity of the produced electrode and the deterioration of the produced electrode due to repetitive charging and discharging. Examples of the particulate binder may include an aqueous dispersion of binder particles such as latex, and a particulate binder obtained by drying such an aqueous dispersion.

The amount of the binder, based on dry weight, is preferably 0.1 part by weight or more and 50 parts by weight or less, more preferably 0.5 part by weight or more and 20 parts by weight or less, and still more preferably 1 part by weight or more and 15 parts by weight or less, relative to 100 parts by weight of the electrode active material, from the viewpoint of sufficiently ensuring adhesion between the obtained electrode active material layer and the substrate and reducing the internal resistance.

The granulated particles may contain a dispersant as an optical component. Examples of the dispersant may include cellulosic polymers such as carboxymethylcellulose and methylcellulose, and ammonium or alkali metal salts thereof. As these dispersants, one type thereof may be solely used, and two or more types thereof may also be used in combination.

The granulated particles may contain an electroconductive material as an optional component. Examples of the electroconductive material may include electroconductive carbon blacks such as furnace black, acetylene black, and Ketjen black (registered trademark of Akzo Nobel Chemicals B.V.). Acetylene black and Ketjen black are preferable. Vapor-grown carbon fibers such as VGCF (registered trademark) and carbon nanotubes; graphite-based carbon materials such as expanded graphite and graphite; and graphene can also be used as the electroconductive material. As these electroconductive materials, one type thereof may be solely used, and two or more types thereof may also be used in combination.

The granulated particles can be produced by granulating the electrode active material and the binder, and optional component(s) that may be included as needed. Examples of the method for producing the granulated particles may include, but are not limited to, known granulation methods such as a fluidized bed granulation method, a spray drying granulation method, and a tumbling bed granulation method.

Each of the granulated particles is preferably in the form of a secondary particle formed by aggregation of a plurality of primary particles.

Specifically, each of the granulated particles is preferably a secondary particle formed by binding a plurality (preferably, several to several tens) of electrode active materials and optional components with the binder.

The volume-average particle diameter (D50) of the granulated particles is preferably 0.1 μm or more, more preferably 1 μm or more, still more preferably 20 μm or more, and further more preferably 30 μm or more, and is preferably 1000 μm or less, more preferably 500 μm or less, and still more preferably 250 μm or less, from the viewpoint of easily obtaining an electrode active material layer having the desired thickness.

The volume-average particle diameter (D50) of the granulated particles is a 50% volume-average particle diameter measured in a dry manner and calculated using a laser scattering and diffraction-based particle size distribution measurement device (for example, Microtrac MT3300EX II; manufactured by MicrotracBEL Corp). The 50% volume-average particle diameter is the particle diameter at a point where the cumulative frequency accumulated from the smaller diameter side on the obtained particle size distribution (volume basis) reaches 50%.

The number-average particle diameter of the granulated particles to be described below is a particle diameter measured in a dry manner and calculated using a laser scattering and diffraction-based particle size distribution measurement device (for example, Microtrac MT3300EX II; manufactured by MicrotracBEL Corp). For example, a 50% number-average particle diameter (D50) is the particle diameter at a point where the cumulative frequency accumulated from the smaller diameter side on the obtained particle size distribution (number basis) reaches 50%.

1. First Embodiment

A production apparatus of an electrode active material layer according to a first embodiment will be described below with reference to the drawings.

Figure 3:
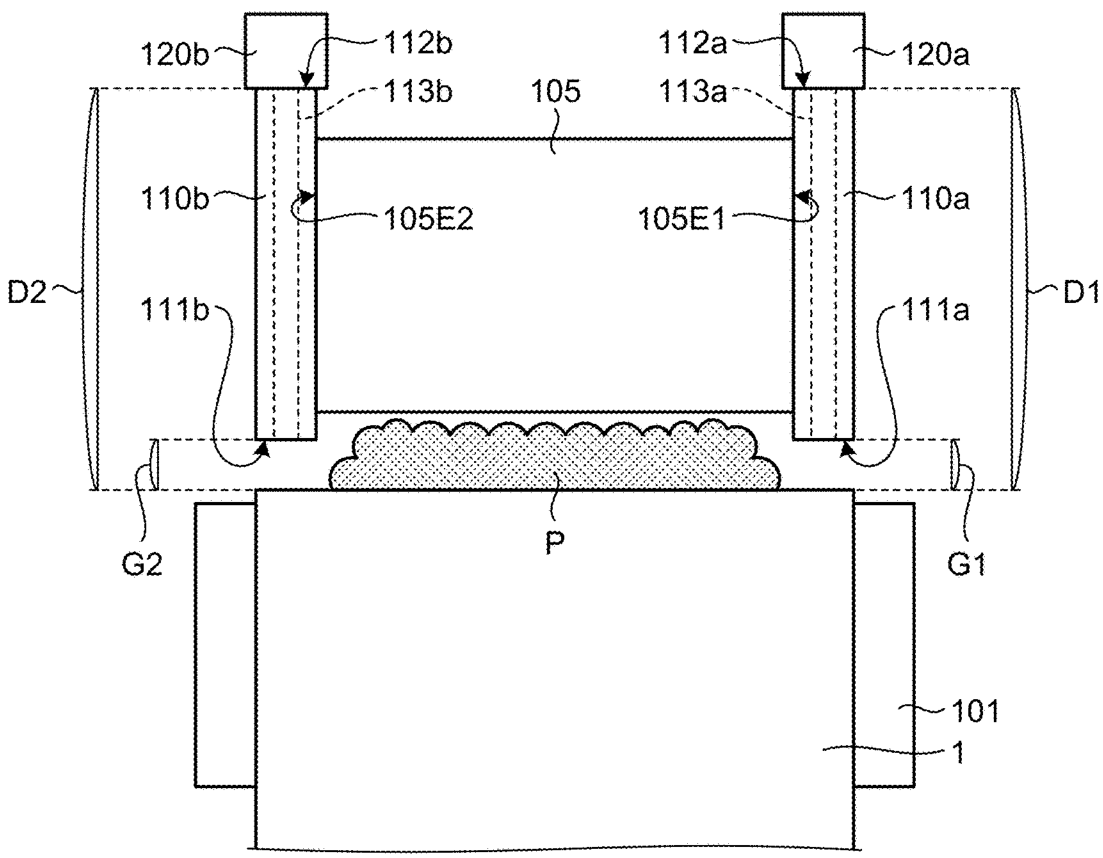
FIG. 3 is a side view schematically illustrating a part of the production apparatus according to the first embodiment.
Figure 4:
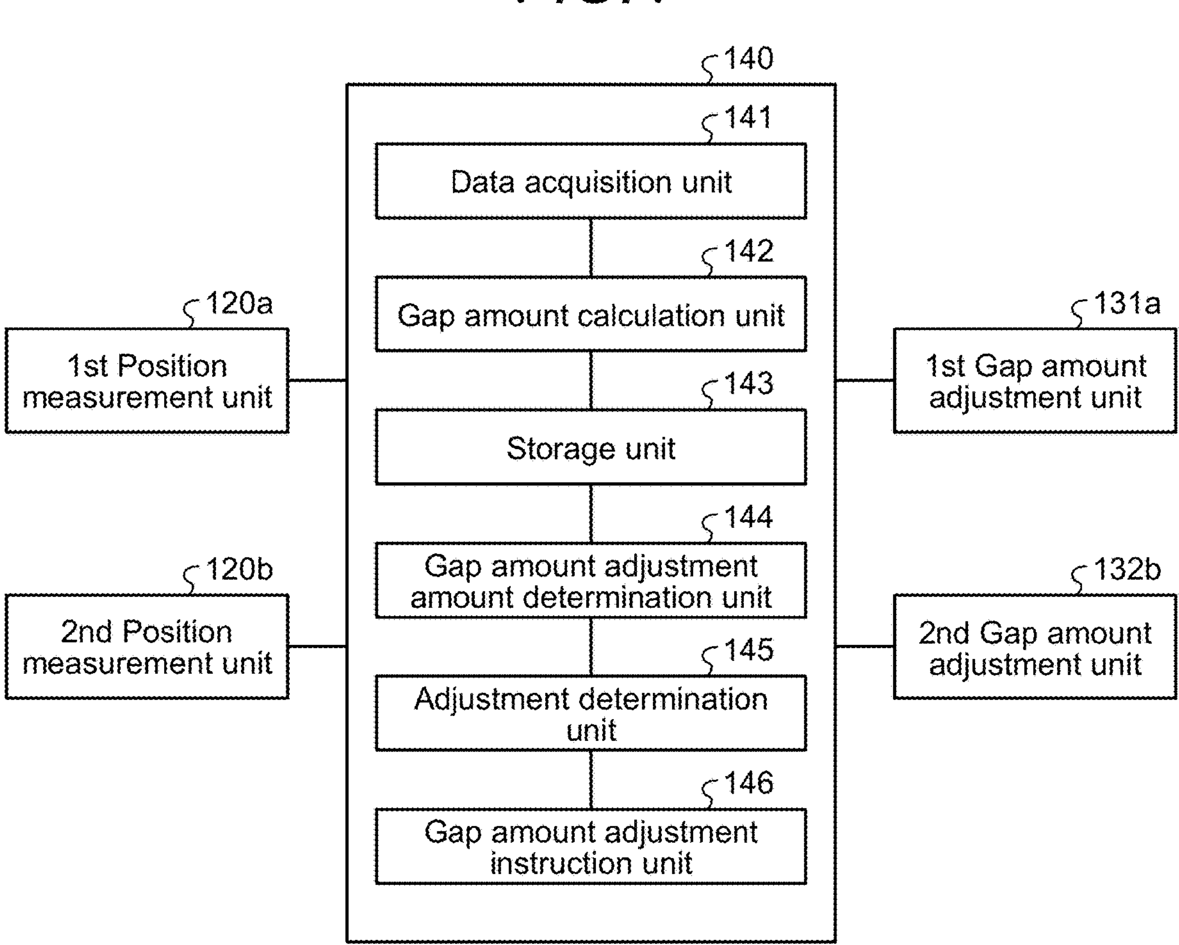
FIG. 4 is a schematic diagram illustrating a configuration of a control unit of the production apparatus according to the first embodiment.

FIG. 1 is a schematic diagram illustrating the production apparatus of an electrode active material layer according to the first embodiment. FIG. 2 is a top view schematically illustrating a part of the production apparatus according to the first embodiment. FIG. 3 is a side view schematically illustrating a part of the production apparatus according to the first embodiment. FIG. 4 is a schematic diagram illustrating a configuration of a control unit of the production apparatus according to the first embodiment.

As illustrated in FIG. 1, a production apparatus 100 according to the present embodiment includes a forming roll 101, a feeding unit 103, a third conveying unit 104, a squeegee roll 105 serving as a squeegee unit, a first stock guide 110*a*, a second stock guide 110*b*, a first position measurement unit 120*a*, a second position measurement unit 120*b*, a rolling roll 130*a*, a first gap amount adjustment unit 131*a*, a second gap amount adjustment unit 131*b*, and a control unit 140. The forming roll 101 functions as a support unit, as a first conveying unit, and with the rolling roll 130*a*, as a rolling unit 130.

In the present embodiment, the production apparatus 100 includes one squeegee roll and two stock guides. In another embodiment, a production apparatus may include two or more, n squeegee rolls and (n+1) stock guides. The n squeegee rolls and the (n+1) stock guides may be alternately disposed so that a stock guide is located at each end of a squeegee roll. An electrode active material layer of stripe shape can thereby be stably produced.

The forming roll 101 is a cylindrical member and is supported to be rotatable about an axis R101 in a direction DR101. The third conveying unit 104 conveys a substrate 1 to the forming roll 101 serving as the support unit. The forming roll 101 conveys the substrate 1 downstream while rotating in the direction DR101. An example of the third conveying unit 104 is a conveying roll.

The feeding unit 103 feeds granulated particles P, onto a main surface of the substrate 1 supported by the forming roll 101 and above the forming roll 101. An optional powder feeding device may be used as the feeding unit 103. Examples of the powder feeding mechanism may include a pressure-feeding type, a rotary vane type, a screw type, and a rotary drum type.

The feeding unit 103 of the present embodiment includes a hopper unit having a granulated particle inlet and a granulated particle outlet. The granulated particles P are loaded from the granulated particle inlet. The granulated particles P are fed through the granulated particle outlet onto the main surface of the substrate 1 supported by the forming roll 101. That is, in the present embodiment, the surface to which the granulated particles P are fed is the main surface of the substrate 1.

The forming roll 101 serving as the first conveying unit rotates in the direction DR101 to thereby convey the granulated particles P, which have been fed onto the main surface of the substrate 1, downstream together with the substrate 1.

The squeegee roll 105 serving as the squeegee unit is a cylindrical member and supported to be rotatable about the axis R105 in a direction DR105 opposite to the direction DR101. A not-shown driving device is attached to the squeegee roll 105, and rotates the squeegee roll 105 in the direction DR105.

The rotation of the squeegee roll 105 in the direction DR105 opposite to the conveyance direction of the substrate 1 levels the granulated particles P fed onto and conveyed on the main surface of the substrate 1 supported by the forming roll 101 to a predetermined thickness, whereby a granulated particle layer 2 is formed.

The squeegee roll 105 is provided with a not-shown position adjustment mechanism so that the distance between the peripheral surface of the squeegee roll 105 and the peripheral surface of the forming roll 101 serving as the first conveying unit can be adjusted. The thickness of the granulated particle layer 2 can be adjusted by adjusting the distance. As a result, the weight per unit area (basis weight) of an electrode active material layer 3 obtained by rolling the granulated particle layer 2 can be adjusted.

As shown in FIG. 2, the squeegee roll 105 has a first end face 105E1 and a second end face 105E2 perpendicular to the axis R105.

The first stock guide 110*a* having a plate shape is disposed in parallel with the first end face 105E1 of the squeegee roll 105. The second stock guide 110*b* having a plate shape is disposed in parallel with the second end face 105E2 of the squeegee roll 105.

A distance W110 between the main surface of the first stock guide 110*a* on the squeegee roll 105 side and the main surface of the second stock guide 110*b* on the squeegee roll 105 side is equivalent to the width of the electrode active material layer 3 to be produced.

The material constituting the first stock guide 110*a* and the second stock guide 110*b* is not limited in particular. Examples of the material of the stock guide may include: resins such as poly(tetrafluoroethylene) (PTFE), poly(acrylonitrile butadiene styrene) (ABS), polypropylene (PP), polystyrene (PS), polyethylene (PE), ultra-high-molecular-weight polyethylene, monomer casting nylon (UMC), poly (vinyl chloride) (PVC), polyacetal, and a methacrylic resin; and metals such as aluminum and stainless steel. Since the coefficient of dynamic friction of the stock guides can be reduced, the material of the stock guide is preferably a resin, and more preferably a fluororesin such as PTFE.

The first stock guide 110*a* and the second stock guide 110*b* preferably have low dynamic friction with the substrate 1. Specifically, the first stock guide 110*a* and the second stock guide 110*b* preferably have a coefficient of dynamic friction of 0.50 or lower, and more preferably 0.40 or lower. The coefficient of dynamic friction of the first stock guide 110*a* and the second stock guide 110*b* is ideally 0, and the lower limit can be 0.04 or higher. The coefficient of dynamic friction of the first stock guide 110*a* and the second stock guide 110*b* with the substrate 1 can be measured in accordance with JIS K7125.

The lower the coefficient of dynamic friction of the stock guide is, the more the adhesion between the granulated particles and the stock guide is likely to decrease. As a result, the decrease in the smoothness of the end portion of the electrode active material layer due to the adhesion of the granulated particles to the stock guide can be suppressed.

In addition, the stock guide may be subjected to a surface treatment in order to reduce the coefficient of dynamic friction. Examples of such a surface treatment may include a fluororesin coating treatment, application of a lubricant, and a plating treatment.

The first stock guide 110*a*, the second stock guide 110*b*, and the squeegee roll 105 constitute a squeegee device, to respective end portions of which fixing members for restricting the movement of the first stock guide 110*a* and the second stock guide 110*b* in the axial direction of the rotation shaft may be attached. For example, the fixing members may include a fixing plate fixed to the rotation shaft and an elastic member including an elastic body such as a coil spring, a leaf spring, and a rubber plate. Specifically, the fixing members may be configured so that the elastic members press the first stock guide 110*a* and the second stock guide 110*b* disposed at both end portions of the squeegee roll 105 toward the center of the squeegee roll 105 in the axial direction, whereby the first stock guide 110*a* and the second stock guide 110*b* are fixed to not move in the axial direction of the rotation shaft. Such a configuration of the fixing members makes the first stock guide 110*a* and the second stock guide 110*b* freely rotatable about the rotation shaft. Since the fixing members fix the first stock guide 110*a* and the second stock guide 110*b* so that the first stock guide 110*a* and the second stock guide 110*b* can rotate freely about the rotation shaft and do not move in the axial direction of the rotation shaft, the positions of both the first stock guide 110*a* and the second stock guide 110*b* in the lengthwise direction of the squeegee device are less likely to vary due to vibrations during production, or the like. This suppresses a change in the distance between the main surfaces of the first stock guide 110*a* and the second stock guide 110*b*, and the electrode active material layer 3 with a predetermined width can be stably produced.

The fixing members may be configured to be detachably attachable to the rotation shaft, and the first stock guide 110*a*, the second stock guide 110*b*, and the squeegee roll 105 can be detached from the squeegee device as needed. If the first stock guide 110*a*, the second stock guide 110*b*, or the squeegee roll 105 needs to be replaced due to wear or other reasons, only the member to be replaced can thus be replaced easily. This reduces the effort for member replacement and increases the continuous operation period of the production apparatus 100, whereby the electrode active material layer 3 can be stably produced.

As shown in FIG. 3, the first stock guide 110*a* has a first surface 111*a* facing the peripheral surface of the forming roll 101, which serves as a support unit, via the substrate 1.

The second stock guide 110*b* also has a second surface 111*b* facing the peripheral surface of the forming roll 101, which serves as a support unit, via the substrate 1.

The first surface 111*a* and the second surface 111*b* both have a shape that conforms to the peripheral surface of the forming roll 101 serving as the support unit. In the present embodiment, the first surface 111*a* and the second surface 111*b* are concave curved surfaces having substantially the same radius of curvature as that of the forming roll 101, and preferably a radius of curvature that is 95% or more and 110% or less of the radius of curvature of the forming roll 101. Since the first surface 111*a* and the second surface 111*b* have a shape that conforms to the peripheral surface of the forming roll 101, it is possible to reduce the leakage of the granulated particles P, which have been fed above the forming roll 101, from a gap between the first surface 111*a* of the first stock guide 110*a* and the main surface of the substrate 1 supported by the peripheral surface of the forming roll 101, and from a gap between the second surface 111*b* of the second stock guide 110*b* and the main surface of the substrate 1 supported by the peripheral surface of the forming roll 101, to the outer side in the direction of the axis R101 of the forming roll 101. The gap amount G1 between the first surface 111*a* of the first stock guide 110*a* and the main surface of the substrate 1 to which the granulated particles P are fed and the gap amount G2 between the second surface 111*b* of the second stock guide 110*b* and the main surface of the substrate 1 to which the granulated particles P are fed can be adjusted by the first gap amount adjustment unit 131*a* and the second gap amount adjustment unit 131*b*, to be described below, respectively.

The first position measurement unit 120*a* is fixed to a first end face 112*a* of the first stock guide 110*a* opposite to the first surface 111*a*. The second position measurement unit 120*b* is fixed to a second end face 112*b* of the second stock guide 110*b* opposite to the second surface 111*b*. The first position measurement unit 120*a* and the second position measurement unit 120*b* can be measuring instruments such as a laser displacement meter. Since the first position measurement unit 120*a* is fixed to the first stock guide 110*a*, the first position measurement unit 120*a* moves up and down with the first stock guide 110*a* when the first gap amount adjustment unit 131*a* to be described below moves the first stock guide 110*a* up and down. Similarly, since the second position measurement unit 120*b* is fixed to the second stock guide 110*b*, the second position measurement unit 120*b* also moves up and down with the second stock guide 110*b* when the second gap amount adjustment unit 131*b* to be described below moves the second stock guide 110*b* up and down. The first position measurement unit 120*a* can thus measure a distance (distance D1) corresponding to the gap amount G1. The second position measurement unit 120*b* can measure a distance (distance D2) corresponding to the gap amount G2.

A first slit 113*a* serving as a first through-hole is provided in the first stock guide 110*a* to run through from the first end face 112*a*, to which the first position measurement unit 120*a* is fixed, to the first surface 111*a*. The first slit 113*a* is provided to be parallel to the main surface of the first stock guide 110*a*. In the present embodiment, the first position measurement unit 120*a* emits laser light from a not-shown laser emission port. The emitted laser light passes through the first slit 113*a* and is reflected by the surface, to which the granulated particles P are fed, opposite to the first surface 111*a*. In another embodiment, the first slit 113*a* does not need to be parallel to the main surface of the first stock guide 110*a*.

The reflected laser light passes through the first slit 113*a* and is received by a not-shown photoreceptor unit of the first position measurement unit 120*a*, whereby the distance D1 between the first position measurement unit 120*a* and the surface to which the granulated particles P are fed can be measured.

Like the first stock guide 110*a*, the second stock guide 110*b* has a second slit 113*b* serving as a second through-hole, which runs through from the second end face 112*b*, to which the second position measurement unit 120*b* is fixed, to the second surface 111*b*. The second slit 113*b* is provided to be parallel to the main surface of the second stock guide 110*b*. The second position measurement unit 120*b* can measure the distance D2 between the second position measurement unit 120*b* and the surface to which the granulated particles P are fed. In another embodiment, the second slit 113*b* does not need to be parallel with the main surface of the second stock guide 110*b*.

In the present embodiment, the first through-hole and the second through-hole both have a slit shape. However, in another embodiment, the first through-hole and the second through-hole may have a cylindrical shape each.

The first position measurement unit 120*a* and the second position measurement unit 120*b* are fixed to the first stock guide 110*a* and the second stock guide 110*b*, respectively, and the first slit 113*a* and the second slit 113*b* are provided to measure the distance D1 and the distance D2. This can reduce rattling of the first position measurement unit 120*a* and the second position measurement unit 120*b* and improve the measurement accuracy of the distances D1 and D2.

The first position measurement unit 120*a* and the second position measurement unit 120*b* are both electrically connected to the control unit 140 to be described below.

As shown in FIG. 1, the first stock guide 110*a* is provided with the first gap amount adjustment unit 131*a* for adjusting the gap amount G1. The second stock guide 110*b* is provided with the second gap amount adjustment unit 131*b* for adjusting the gap amount G2. An optional mechanism such as an elevating mechanism including a servo motor and a ball screw may be used as the mechanism for adjusting the gap amount G1 or the gap amount G2. In the present embodiment, a nut is fixed to each of the first stock guide 110*a* and the second stock guide 110*b*. A ball screw to mesh with the nut is situated along a direction orthogonal to the axis R101 of the forming roll 101. A servo motor is attached to the end portion of the ball screw so that the ball screw can be driven to rotate.

As described above, the squeegee roll 105 is provided with the position adjustment mechanism so that the distance between the peripheral surface of the squeegee roll 105 and the peripheral surface of the forming roll 101 serving as the first conveying unit can be adjusted. The first gap amount adjustment unit 131*a* and the second gap amount adjustment unit 131*b* are configured so that the gap amount G1 and the gap amount G2 can be adjusted, respectively, independent of the adjustment of the distance between the peripheral surface of the squeegee roll 105 and the peripheral surface of the forming roll 101.

The first gap amount adjustment unit 131*a* and the second gap amount adjustment unit 131*b* are both electrically connected to the control unit 140 to be described below. The first gap amount adjustment unit 131*a* and the second gap amount adjustment unit 131*b* each receive a control signal from the control unit 140. Based on the signal from the control unit 140, the first gap amount adjustment unit 131*a* adjusts the gap amount G1, and the second gap amount adjustment unit 131*b* adjusts the gap amount G2. In the present embodiment, the first gap amount adjustment unit 131*a* that is a servo motor rotates the ball screw in a specified direction of rotation by a specified amount of rotation based on the signal from the control unit 140. The second gap amount adjustment unit 131*b* that is a servo motor rotates the ball screw in a specified direction of rotation by a specified amount of rotation based on the signal from the control unit 140. The gap amount G1 and the gap amount G2 can thus be independently adjusted by independently moving the first stock guide 110*a* and the second stock guide 110*b* up and down.

The rolling unit 130 includes the forming roll 101 functioning as a rolling roll and the rolling roll 130*a*. The rolling roll 130*a* is a cylindrical member, and is driven to rotate about the axis R130*a* at a constant speed in a direction in which the substrate 1 and the granulated particle layer 2 are conveyed downstream. The axis R101 and the axis R130*a* are disposed to be parallel to each other. A gap is provided between the peripheral surface of the forming roll 101 and the peripheral surface of the rolling roll 130*a*. The granulated particle layer 2 is guided into the gap between the forming roll 101 and the rolling roll 130*a*. In the present embodiment, the granulated particle layer 2 is formed on the substrate 1, and the stacked body of the substrate 1 and the granulated particle layer 2 is guided into the gap between the forming roll 101 and the rolling roll 130*a*. The granulated particle layer 2 stacked on the substrate 1 is rolled to be brought into close contact with the substrate 1 when passing through the gap between the forming roll 101 and the rolling roll 130*a*, whereby the electrode active material layer 3 having a predetermined thickness is formed on the substrate 1.

The gap (distance) between the peripheral surface of the forming roll 101 and the peripheral surface of the rolling roll 130*a* can be adjusted as appropriate depending on the desired thickness, porosity, etc., of the electrode active material layer 3.

Examples of the material constituting the peripheral surfaces of the forming roll 101 and the rolling roll 130*a* may include a rubber, metal, and an inorganic material.

The rolling roll 130*a* may have a mechanism for heating the peripheral surface thereof. This configuration can roll the granulated particle layer 2 while heating it. By rolling the granulated particle layer 2 while heating, the binder contained in the granulated particles P can be softened or melted. As a result, the granulated particles P can be more firmly bound to each other.

Figure 5:
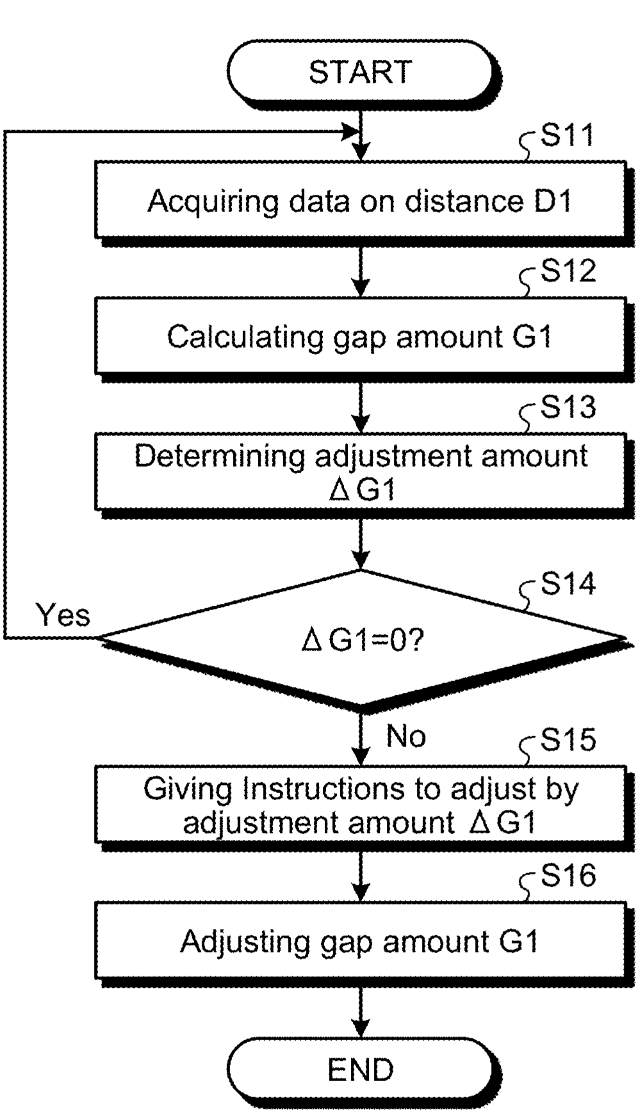
FIG. 5 is a flowchart for describing processing performed by the control unit according to the first embodiment.
Figure 6:
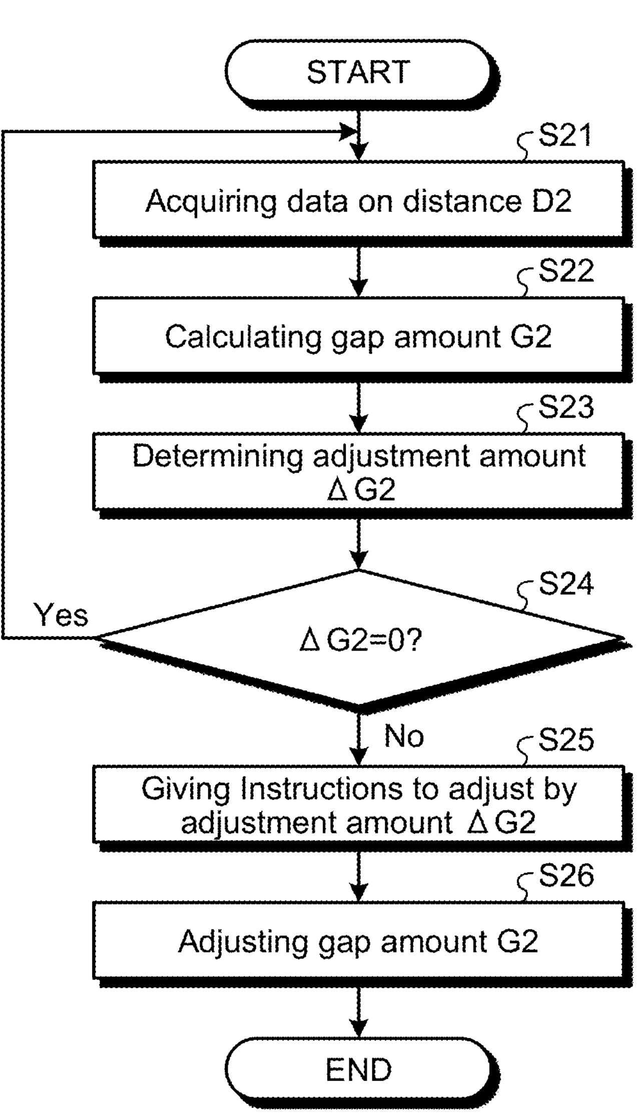
FIG. 6 is a flowchart for describing processing performed by the control unit according to the first embodiment.

As illustrated in FIG. 4, the control unit 140 is electrically connected to the first position measurement unit 120*a*, the second position measurement unit 120*b*, the first gap amount adjustment unit 131*a*, and the second gap amount adjustment unit 131*b*. FIGS. 5 and 6 are flowcharts for describing processing performed by the control unit 140 according to the first embodiment.

As shown in FIG. 4, the control unit 140 includes a data acquisition unit 141, a gap amount calculation unit 142, a storage unit 143, a gap amount adjustment amount determination unit 144, an adjustment determination unit 145, and a gap amount adjustment instruction unit 146.

The data acquisition unit 141 acquires data on the distance D1 from the first position measurement unit 120*a* (step S11).

The gap amount calculation unit 142 calculates the gap amount G1 between the first surface 111*a* of the first stock guide 110*a* and the main surface of the substrate 1, which is a surface to which the granulated particles P are fed, based on the data on the distance D1 and dimension data on the first stock guide 110*a* stored in the storage unit 143 (step S12).

The gap amount adjustment amount determination unit 144 determines the adjustment amount ΔG1 for the gap amount G1 based on a difference between the calculated gap amount G1 and a gap amount threshold T1 stored in the storage unit 143 (step S13). A value greater than 0 μm is set as the gap amount threshold T1.

The adjustment determination unit 145 determines whether the adjustment amount ΔG1 for the gap amount G1 is 0 (whether the gap amount G1 needs to be adjusted) (step S14). If ΔG1 is 0 (step S14: Yes), the processing returns to step S11.

If ΔG1 is not 0 (step S14: No), the gap amount adjustment instruction unit 146 instructs the first gap amount adjustment unit 131*a* to make an adjustment by the determined adjustment amount ΔG1 (step S15).

The first gap amount adjustment unit 131*a* moves the first stock guide 110*a* up or down based on the instructed adjustment amount ΔG1 to adjust the gap amount G1 (step S16).

Similarly, the data acquisition unit 141 acquires data on the distance D2 from the second position measurement unit 120*b* (step S21).

The gap amount calculation unit 142 calculates the gap amount G2 between the second surface 111*b* of the second stock guide 110*b* and the main surface of the substrate 1, i.e., the surface to which the granulated particles P are fed based on the data on the distance D2 and dimension data on the second stock guide 110*b* stored in the storage unit 143 (step S22).

The gap amount adjustment amount determination unit 144 determines the adjustment amount ΔG2 for the gap amount G2 based on a difference between the calculated gap amount G2 and a gap amount threshold T2 stored in the storage unit 143 (step S23). A value greater than 0 μm is set as the gap amount threshold T2.

The adjustment determination unit 145 determines whether the adjustment amount ΔG2 for the gap amount G2 is 0 (whether the gap amount G2 needs to be adjusted) (step S24). If ΔG2 is 0 (step S24: Yes), the processing returns to step S21.

If ΔG2 is not 0 (step S24: No), the gap amount adjustment instruction unit 146 instructs the second gap amount adjustment unit 131*b* to make an adjustment by the determined adjustment amount ΔG2 (step S25).

The second gap amount adjustment unit 131*b* moves the second stock guide 110*b* up or down based on the instructed adjustment amount ΔG2 to adjust the gap amount G2 (step S26).

The control unit 140 may perform the processing for causing the first gap amount adjustment unit 131*a* to adjust the gap amount G1 and the processing for causing the second gap amount adjustment unit 131*b* to adjust the gap amount G2 in parallel or in sequence.

The control unit 140 may include a distance prediction unit 150.

FIG. 7 is a schematic diagram showing a configuration of the control unit 140 including the distance prediction unit 150 according to the first embodiment. The control unit 140 includes the distance prediction unit 150 in addition to the data acquisition unit 141, the gap amount calculation unit 142, the storage unit 143, the gap amount adjustment amount determination unit 144, the adjustment determination unit 145, and the gap amount adjustment instruction unit 146. The control unit 140 is electrically connected to the first position measurement unit 120*a*, the second position measurement unit 120*b*, the first gap amount adjustment unit 131*a*, and the second gap amount adjustment unit 131*b*.

The distance prediction unit 150 includes a data set acquisition unit 151, a data set analysis unit 152, and a predicted distance data storage unit 153.

Figure 8:
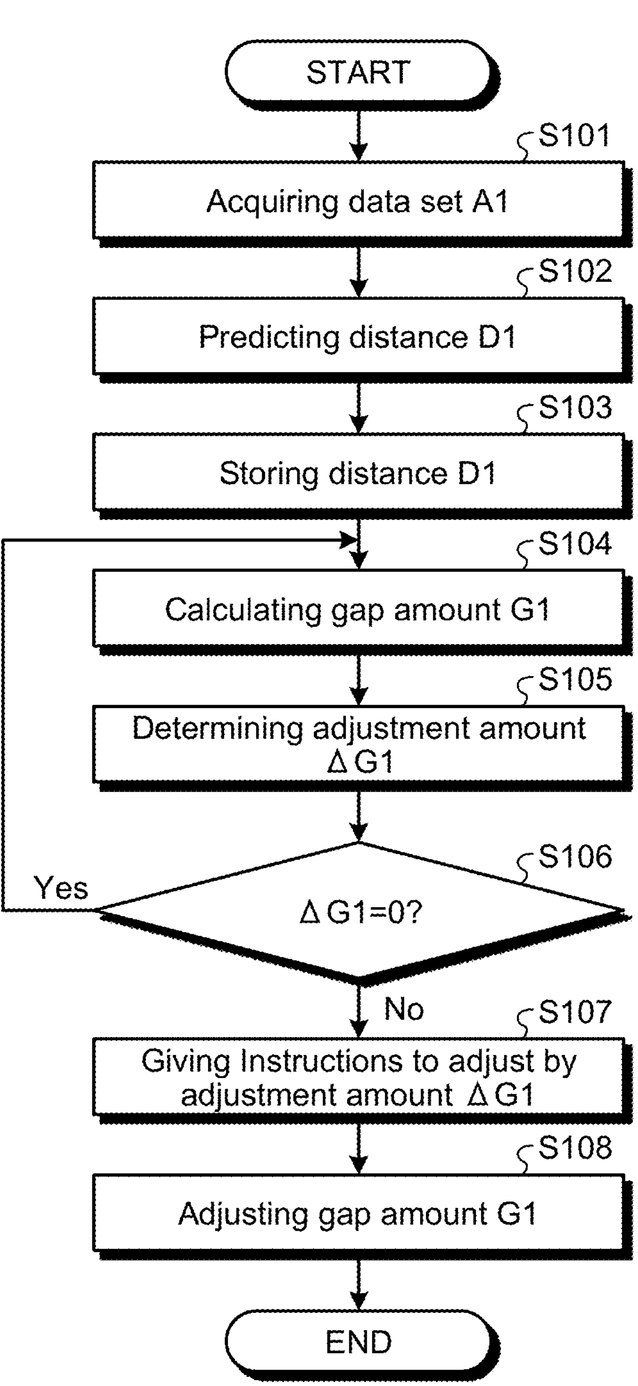
FIG. 8 is a flowchart for describing processing performed by the control unit including the distance prediction unit.
Figure 9:
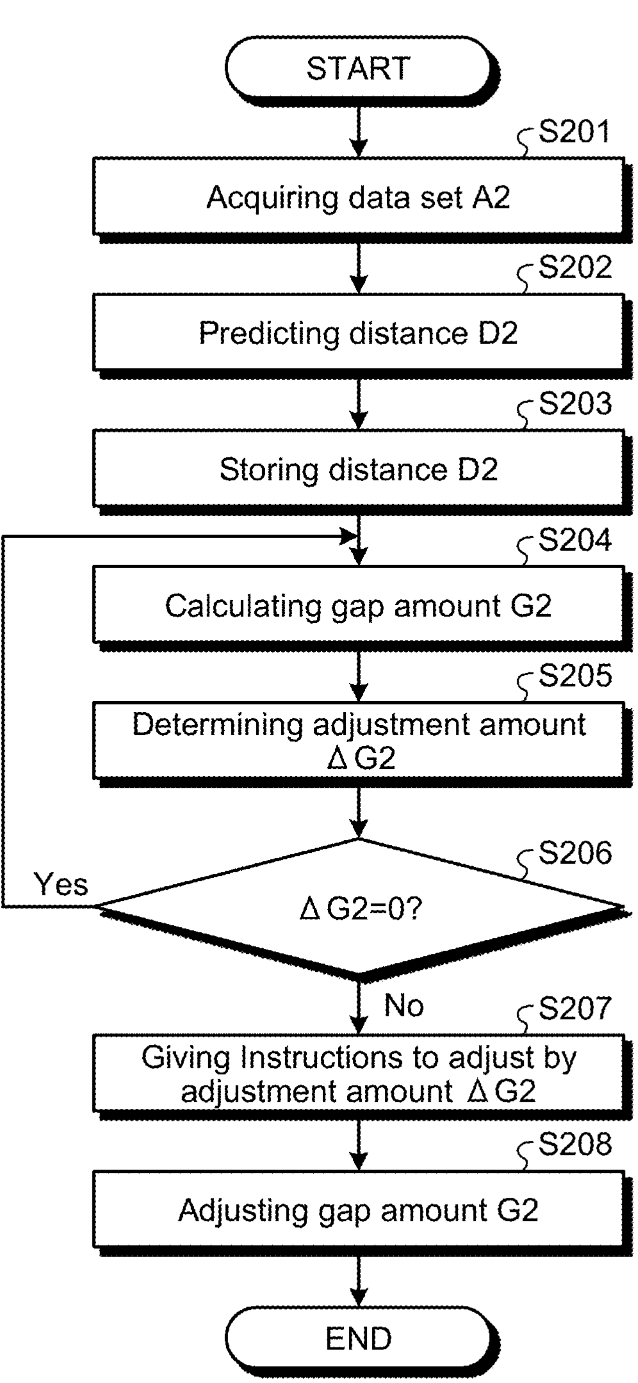
FIG. 9 is a flowchart for describing processing performed by the control unit including the distance prediction unit.

FIGS. 8 and 9 are flowcharts for describing processing performed by the control unit 140 including the distance prediction unit 150.

The data set acquisition unit 151 acquires a data set A1 on the distance D1 during a period in which the forming roll 101 serving as the support unit rotates two revolutions or more (step S101).

The data set analysis unit 152 analyzes the acquired data set A1 and predicts the distance D1, which varies depending on the rotation of the forming roll 101 (step S102).

The predicted distance data storage unit 153 stores the predicted distance D1 in the storage unit 143 (step S103).

The gap amount calculation unit 142 calculates the gap amount G1 between the first surface 111*a* of the first stock guide 110*a* and the main surface of the substrate 1, i.e., the surface to which the granulated particles P are fed based on the data on the predicted distance D1 and the dimension data on the first stock guide 110*a*, stored in the storage unit 143 (step S104).

The gap amount adjustment amount determination unit 144 determines the adjustment amount ΔG1 for the gap amount G1 based on a difference between the calculated gap amount G1 and the gap amount threshold T1 stored in the storage unit 143 (step S105). A value greater than 0 μm is set as the gap amount threshold T1.

The adjustment determination unit 145 determines whether the adjustment amount ΔG1 for the gap amount G1 is 0 (whether the gap amount G1 needs to be adjusted) (step S106). If ΔG1 is 0 (step S106: Yes), the processing returns to step S104.

If ΔG1 is not 0 (step S106: No), the gap amount adjustment instruction unit 146 instructs the first gap amount adjustment unit 131*a* to make an adjustment by the determined adjustment amount ΔG1 (step S107).

The first gap amount adjustment unit 131*a* moves the first stock guide 110*a* up or down to adjust the gap amount G1 based on the instructed adjustment amount ΔG1 (step S108).

The data set acquisition unit 151 acquires a data set A2 on the distance D2 during a period in which the forming roll 101 serving as the support unit rotates two revolutions or more (step S201).

The data set analysis unit 152 analyzes the acquired data set A2 and predicts the distance D2, which varies depending on the rotation of the forming roll 101 (step S202).

The predicted distance data storage unit 153 stores the predicted distance D2 in the storage unit 143 (step S203).

The gap amount calculation unit 142 calculates the gap amount G2 between the second surface 111*b* of the second stock guide 110*b* and the main surface of the substrate 1, i.e., the surface to which the granulated particles P are fed based on the data on the predicted distance D2 and the dimension data on the second stock guide 110*b*, stored in the storage unit 143 (step S204).

The gap amount adjustment amount determination unit 144 determines the adjustment amount ΔG2 for the gap amount G2 based on a difference between the calculated gap amount G2 and the gap amount threshold T2 stored in the storage unit 143 (step S205). A value greater than 0 μm is set as the gap amount threshold T2.

The adjustment determination unit 145 determines whether the adjustment amount ΔG2 for the gap amount G2 is 0 (whether the gap amount G2 needs to be adjusted) (step S206). If ΔG2 is 0 (step S206: Yes), the processing returns to step S204.

If ΔG2 is not 0 (step S206: No), the gap amount adjustment instruction unit 146 instructs the gap amount adjustment unit 131*b* to make an adjustment by the determined adjustment amount ΔG2 (step S207).

The second gap amount adjustment unit 131*b* moves the second stock guide 110*b* up or down to adjust the gap amount G2 based on the instructed adjustment amount ΔG2 (step S208).

The control unit 140 including the distance prediction unit 150 predicts the variable distances D1 and D2, and causes the first gap amount adjustment unit 131*a* to adjust the gap amount G1 and causes the second gap amount adjustment unit 131*b* to adjust the gap amount G2 based on the predicted distances D1 and D2. The adjustment amounts ΔG1 and ΔG2 can thus easily follow variations in the distances D1 and D2. This reduces the leakage of the granulated particles P, which have been fed above the forming roll 101, from the gap between the first surface 111*a* of the first stock guide 110*a* and the main surface of the substrate 1 supported by the peripheral surface of the forming roll 101, and from the gap between the second surface 111*b* of the second stock guide 110*b* and the main surface of the substrate 1 supported by the peripheral surface of the forming roll 101, to the outer side in the direction of the axis R101 of the forming roll 101. This can also prevent the gap amount G1 and the gap amount G2 from being 0 μm, and thereby reduce the first stock guide 110*a* and the second stock guide 110*b* coming into contact with the substrate 1 and distorting the substrate 1. The reduced distortion of the substrate 1 can suppress breakage of the substrate 1 and improve the production stability of the electrode active material layer 3.

The control unit 140 may perform the processing for predicting the distance D1 and the processing for predicting the distance D2 in parallel or in sequence.

The data set analysis unit 152 can analyze the data set A1 or the data set A2 using a conventional known method. Examples of the analysis method may include time series analysis. The variable distance D1 or D2 can be predicted by analyzing the acquired data set A1 or A2 with the circumferential length of the forming roll 101 as a unit of repetition.

The predicted distances D1 and D2 may be predicted as a function with the rotation angle of the forming roll 101 as a variable, for example.

The functions of the control unit 140 may be implemented by a computer including an input interface, an output interface, a CPU (Central Processing Unit), and a storage device (such as a ROM (Read Only Memory) and a RAM (Random Access Memory)). The first position measurement unit 120*a* and the second position measurement unit 120*b* are connected to the input interface. The first gap amount adjustment unit 131*a* and the second gap amount adjustment unit 131*b* are connected to the output interface. The CPU and the storage device are connected to each other by buses. The storage device stores programs. The CPU executes the programs stored in the storage device.

The production apparatus 100 is configured so that the gap amount G1 between the first surface 111*a* of the first stock guide 110*a* and the surface to which the granulated particles P are fed (in the present embodiment, the main surface of the substrate 1) and the gap amount G2 between the second surface 111*b* of the second stock guide 110*b* and the surface to which the granulated particles P are fed (in the present embodiment, the main surface of the substrate 1) become both larger than 0 μm. As a result, it is possible to reduce occurrence of distortion in the substrate 1 due to contact of the first stock guide 110*a* and the second stock guide 110*b* with the substrate 1. As a result of reducing distortion in the substrate 1, breakage of the substrate 1 can be suppressed, and production stability of the electrode active material layer 3 can be improved.

The gap amount threshold T1 and the gap amount threshold T2 can be both set to any value greater than 0 μm. For example, the gap amount threshold T1 and the gap amount threshold T2 each can be preferably less than or equal to a 10% number-average particle diameter (D10) of the granulated particles P, more preferably less than or equal to a 5% number-average particle diameter (D5), and further preferably less than or equal to a 38 number-average particle diameter (D3). The lower limit value is greater than 0% of the volume-average particle diameter (D50) the granulated particles P usually have.

With both the gap amount thresholds T1 and T2 less than or equal to the above-mentioned upper limit value, the leakage of the granulated particles P, which has been fed above the forming roll 101, from the gap between the first surface 111*a* of the first stock guide 110*a* and the main surface of the substrate 1 supported by the peripheral surface of the forming roll 101, and from the gap between the second surface 111*b* of the second stock guide 110*b* and the main surface of the substrate 1 supported by the peripheral surface of the forming roll 101, to the outer side in the direction of the axis R101 of the forming roll 101 can be effectively reduced. This can effectively reduce the leaked granulated particles P being conveyed to the rolling unit 130 and rolled with the granulated particle layer 2. Defective formation of the resulting electrode active material layer 3 can thereby be effectively suppressed. Since the leakage of the granulated particles P can be effectively reduced, the yield of the granulated particles P can be improved to reduce the production costs of the electrode active material layer 3.

In another embodiment, the production apparatus may further include a height sensor for measuring the height of the fed granulated particles upstream of the squeegee device, and a control unit for adjusting the amount of granulated particles to be fed from the feeding unit based on information from the height sensor. Fluctuations in the weight per unit area (basis weight) of the electrode active material layer 3 obtained by rolling the granulated particle layer 2 can thereby be reduced to adjust the basis weight with high precision.

(Optional Configurations)

In the production apparatus according to the present invention, an optional configuration may be disposed as necessary in addition to the above-described configuration.

For example, a coating unit that is disposed upstream of the feeding unit of the production apparatus and that applies a binder coating liquid onto the substrate can be included as an optional configuration. If the production apparatus includes the coating unit, the binder coating liquid can be applied onto the substrate to form a binder coating liquid layer and the granulated particles can be fed onto the binder coating liquid layer. This can make the granulated particles come into close contact with the substrate. Examples of the coating unit may include a slot die head, a gravure head, a bar coat head, and a knife coat head.

The production apparatus can include a collection unit that collects the substrate on which the electrode active material layer has been formed, downstream of the rolling unit. Examples of the collection unit may include a roll for winding up the substrate.

2. Second Embodiment

Next, a production apparatus of an electrode active material layer according to a second embodiment will be described.

FIG. 10 is a schematic diagram illustrating the production apparatus of an electrode active material layer according to the second embodiment.

A production apparatus 200 according to the present embodiment includes a forming roll 201, a feeding unit 103, a second conveying unit 202, a squeegee roll 105 serving as a squeegee unit, a first stock guide 110*a*, a second stock guide 110*b*, a first position measurement unit 120*a*, a second position measurement unit 120*b*, a rolling roll 230*b*, a first gap amount adjustment unit 131*a*, a second gap amount adjustment unit 131*b*, and a control unit 140. The forming roll 201 functions as a support unit, a first conveying unit, and a rolling unit.

The feeding unit 103 feeds granulated particles P onto the forming roll 201 of the production apparatus 200, or more specifically, onto the peripheral surface of the forming roll 201 serving as the support unit. The forming roll 201 serving as the first conveying unit rotates in a direction DR201 to thereby convey the granulated particles P downstream. The squeegee roll 105 rotates in a direction DR105 opposite to the direction DR201, whereby the granulated particles P fed onto and conveyed on the peripheral surface of the forming roll 201 are leveled to a predetermined thickness to form a granulated particle layer 2.

The forming roll 201 is paired with the rolling roll 230*b* to form the rolling unit 230. The rolling roll 230*b* is a cylindrical member and is driven to rotate about an axis R230*b* at a constant speed in the direction in which the substrate 1 and the granulated particle layer 2 are conveyed downstream. An axis R201 of the forming roll 201 and the axis R230*b* of the rolling roll 230*b* are disposed to be parallel to each other. A gap is provided between the peripheral surface of the forming roll 201 and the peripheral surface of the rolling roll 230*b*. As the forming roll 201 rotates, the granulated particle layer 2 conveyed by the peripheral surface of the forming roll 201 is guided into the gap between the forming roll 201 and the rolling roll 230*b*.

The second conveying unit 202 is a conveying roll, for example, and conveys the substrate 1 to the rolling unit 230. Specifically, the second conveying unit 202 conveys the substrate 1 to the peripheral surface of the rolling roll 230*b* constituting the rolling unit 230. As the rolling roll 230*b* rotates, the substrate 1 is guided into the gap between the forming roll 201 and the rolling roll 230*b*.

The granulated particle layer 2 and the substrate 1 are guided into the gap between the forming roll 201 and the rolling roll 230*b*, and stacked. When passing through the gap between the forming roll 201 and the rolling roll 230*b*, the granulated particle layer 2 and the substrate 1 are rolled to form an electrode active material layer 3 having a predetermined thickness on the substrate 1.

The gap between the peripheral surface of the forming roll 201 and the peripheral surface of the rolling roll 230*b* can be adjusted as appropriate depending on the desired thickness, porosity, etc., of the electrode active material layer 3. Examples of the material constituting the peripheral surface of the rolling roll 230*b* may include the materials mentioned in the description of the rolling roll 130*b*. The rolling roll 230*b* may include a mechanism for heating its peripheral surface.

Like the production apparatus 100, the production apparatus 200 is configured so that the gap amount G1 between the first surface 111*a* of the first stock guide 110*a* and the surface to which the granulated particles P are fed (in the present embodiment, the peripheral surface of the forming roll 201 serving as the support unit) and the gap amount G2 between the second surface 111*b* of the second stock guide 110*b* and the surface to which the granulated particles P are fed (in the present embodiment, the peripheral surface of the forming roll 201 serving as the support unit) become both larger than 0 μm. This reduces the first stock guide 110*a* and the second stock guide 110*b* coming into contact with the forming roll 201 and being worn by the same. As a result, the production stability of the electrode active material layer 3 can be improved.

The production apparatus 200 includes the first stock guide 110*a*, the second stock guide 110*b*, the first position measurement unit 120*a*, the second position measurement unit 120*b*, the first gap amount adjustment unit 131*a*, the second gap amount adjustment unit 131*b*, and the control unit 140, which are configured the same as those of the production apparatus 100. Like the production apparatus 100, the production apparatus 200 can thus effectively reduce the leakage of the granulated particles P, which have been fed onto the forming roll 201, from the gap between the first surface 111*a* of the first stock guide 110*a* and the peripheral surface of the forming roll 201, and from the gap between the second surface 111*b* of the second stock guide 110*b* and the peripheral surface of the forming roll 201, to the outer side in the direction of the axis R201 of the forming roll 201. This can effectively reduce the leaked granulated particles P being conveyed to the rolling unit 230 and rolled together with the granulated particle layer 2. Defective formation of the resulting electrode active material layer 3 can thereby be effectively suppressed. Since the leakage of the granulated particles P can be effectively reduced, the yield of the granulated particles P can be improved to reduce the production costs of the electrode active material layer 3.

3. Third Embodiment

Next, a production apparatus of an electrode active material layer according to a third embodiment will be described.

Figure 11:
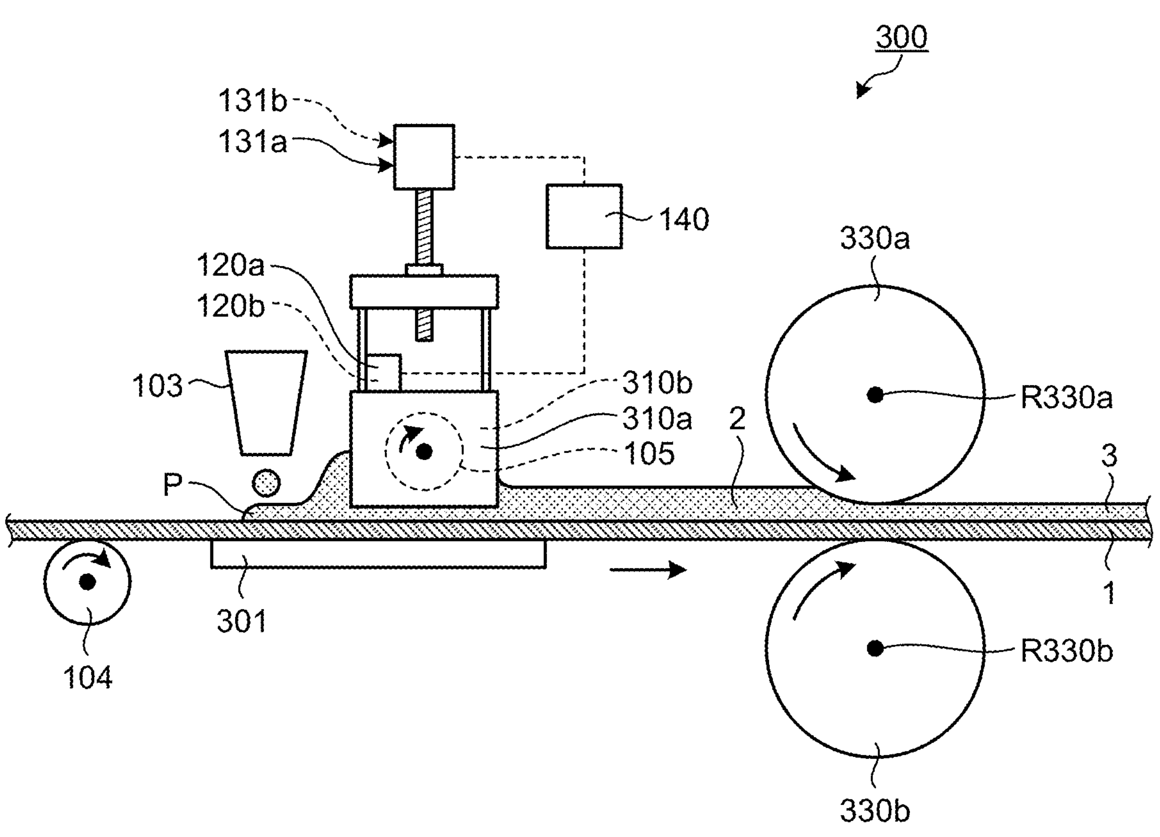
FIG. 11 is a schematic diagram showing a production apparatus of an electrode active material layer according to a third embodiment.
Figure 12:
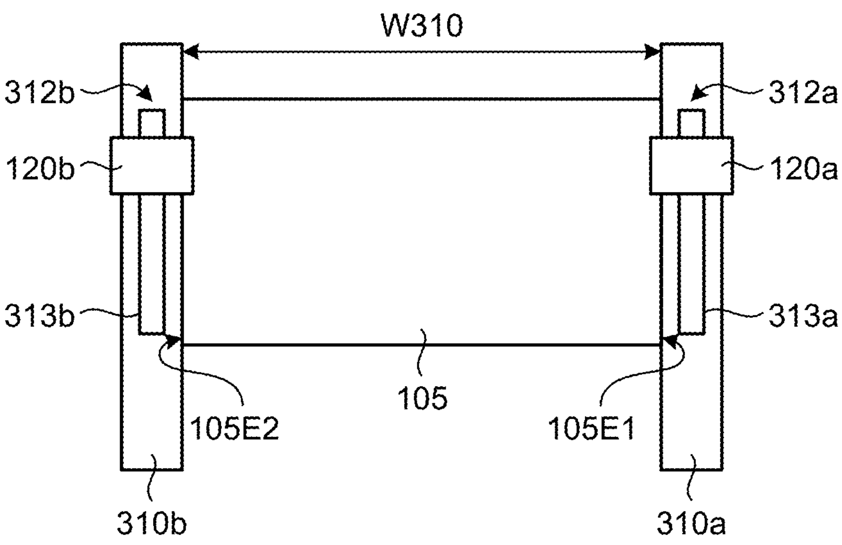
FIG. 12 is a top view schematically illustrating a part of the production apparatus according to the third embodiment.
Figure 13:
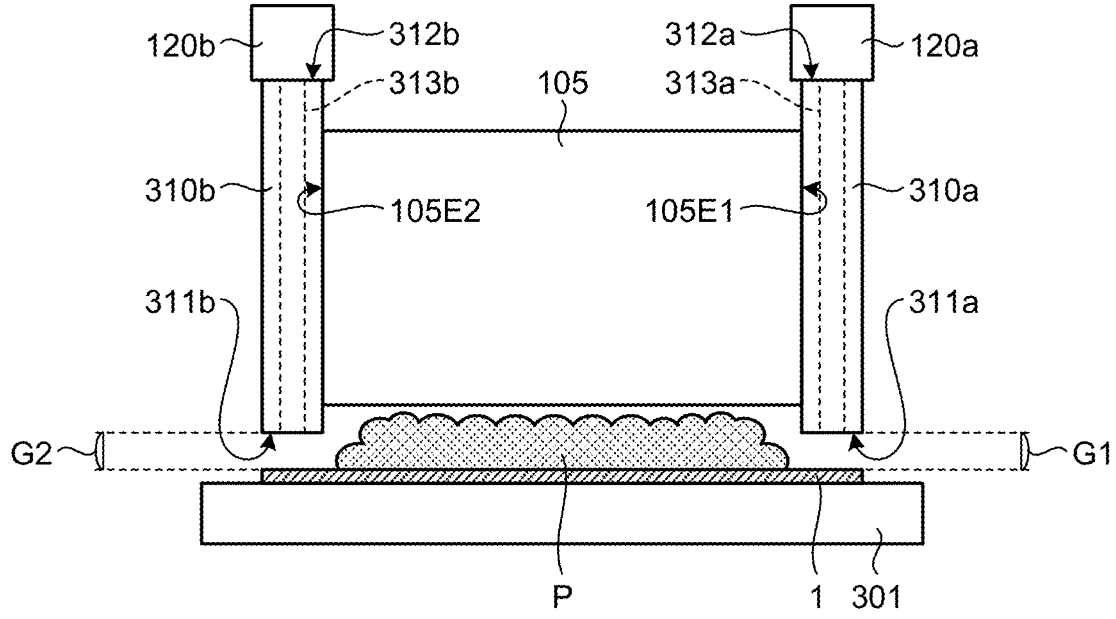
FIG. 13 is a side view schematically illustrating a part of the production apparatus according to the third embodiment.

FIG. 11 is a schematic diagram showing the production apparatus of an electrode active material layer according to the third embodiment. FIG. 12 is a top view schematically showing a part of the production apparatus according to the third embodiment. FIG. 13 is a side view schematically showing a part of the production apparatus according to the third embodiment.

A production apparatus 300 according to the present embodiment includes a support unit 301, a feeding unit 103, a third conveying unit 104, a pair of rolling rolls 330*a* and 330*b* serving as a first conveying unit and a rolling unit, a squeegee roll 105 serving as a squeegee unit, a first stock guide 310*a*, a second stock guide 310*b*, a first position measurement unit 120*a*, a second position measurement unit 120*b*, a first gap amount adjustment unit 131*a*, a second gap amount adjustment unit 131*b*, and a control unit 140.

In the present embodiment, the support unit 301 has a board-like shape. The feeding unit 103 feeds the granulated particles P onto the main surface of a substrate 1 supported by the support unit 301 above the support unit 301. In other words, the surface to which the granulated particles P are fed is the main surface of the substrate 1. The rolling rolls 330*a* and 330*b* serving as the first conveying unit rotate in opposite directions to thereby convey the substrate 1 and the granulated particles P fed onto the main surface of the substrate 1 downstream.

The squeegee roll 105 is configured so that the distance between the peripheral surface of the squeegee roll 105 and the support unit 301 can be adjusted.

As shown in FIG. 12, the first stock guide 310*a* having a plate shape is disposed in parallel with a first end face 105E1 of the squeegee roll 105. The second stock guide 310*b* having a plate shape is disposed in parallel with a second end face 105E2 of the squeegee roll 105.

A distance W310 between the main surface of the first stock guide 310*a* on the squeegee roll 105 side and the main surface of the second stock guide 310*b* on the squeegee roll 105 side corresponds to the width of the electrode active material layer 3 to be produced.

As shown in FIG. 13, the first stock guide 310*a* has a first surface 311*a* facing the main surface of the support unit 301 via the substrate 1.

The second stock guide 310*b* has a second surface 311*b* facing the main surface of the support unit 301 via the substrate 1.

The first surface 311*a* and the second surface 311*b* both have a flat shape conforming to the main surface of the support unit 301.

The first stock guide 310*a* and the second stock guide 310*b* are provided so that the first surface 311*a* and the second surface 311*b* are parallel to the main surface of the support unit 301, respectively.

A first slit 313*a* serving as a first through-hole is provided in the first stock guide 310*a* to run through from a first end face 312*a*, to which the first position measurement unit 120*a* is fixed, to the first surface 311*a*. The first slit 313*a* is provided to be parallel to the main surface of the first stock guide 310*a*. Like the first stock guide 310*a*, the second stock guide 310*b* has a second slit 313*b* serving as a second through-hole, which runs through from a second end face 312*b*, to which the second position measurement unit 120*b* is fixed, to the second surface 311*b*. The second slit 313*b* is provided to be parallel to the main surface of the second stock guide 310*b*. The first position measurement unit 120*a* and the second position measurement unit 120*b* are fixed to the first stock guide 310*a* and the second stock guide 310*b*, respectively, and the first slit 313*a* and the second slit 313*b* are provided to measure the distance D1 and the distance D2. This can reduce rattling of the first position measurement unit 120*a* and the second position measurement unit 120*b* and improve the measurement accuracy of the distances D1 and D2.

In the present embodiment, the first through-hole and the second through-hole both have a slit shape. However, in another embodiment, the first through-hole and the second through-hole may have a cylindrical shape each.

In another embodiment, the first slit 313*a* does not need to be parallel to the main surface of the first stock guide 310*a*. The second slit 313*b* does not need to be parallel to the main surface of the second stock guide 310*b*.

The paired rolling rolls 330*a* and 330*b* are configured to function as the first conveying unit and the rolling unit as well. The paired rolling rolls 330*a* and 330*b* are disposed so that the rotation axes R330*a*, R330*b* are parallel to each other. In the present embodiment, the support unit 301 and the paired rolling rolls 330*a*, 330*b* are disposed so that a plane including the rotation axis R330*a* of the rolling roll 330*a* and the rotation axis R330*b* of the rolling roll 330*b* is orthogonal to a plane including the main surface of the support unit 301.

Like the production apparatus 100, the production apparatus 300 is configured so that the gap amount G1 between the first surface 311*a* of the first stock guide 310*a* and the surface to which the granulated particles P are fed (in the present embodiment, the main surface of the substrate 1) and the gap amount G2 between the second surface 311*b* of the second stock guide 310*b* and the surface to which the granulated particles P are fed (in the present embodiment, the main surface of the substrate 1) become both larger than 0 μm. This reduces occurrence of distortion in the substrate 1 due to the contact of the first stock guide 310*a* and the second stock guide 310*b* with the substrate 1. The reduced distortion of the substrate 1 can suppress breakage of the substrate 1 and improve the production stability of the electrode active material layer 3.

<4. Modification of Third Embodiment>

Next, a production apparatus of an electrode active material layer according to a modification of the third embodiment will be described.

Figure 14:
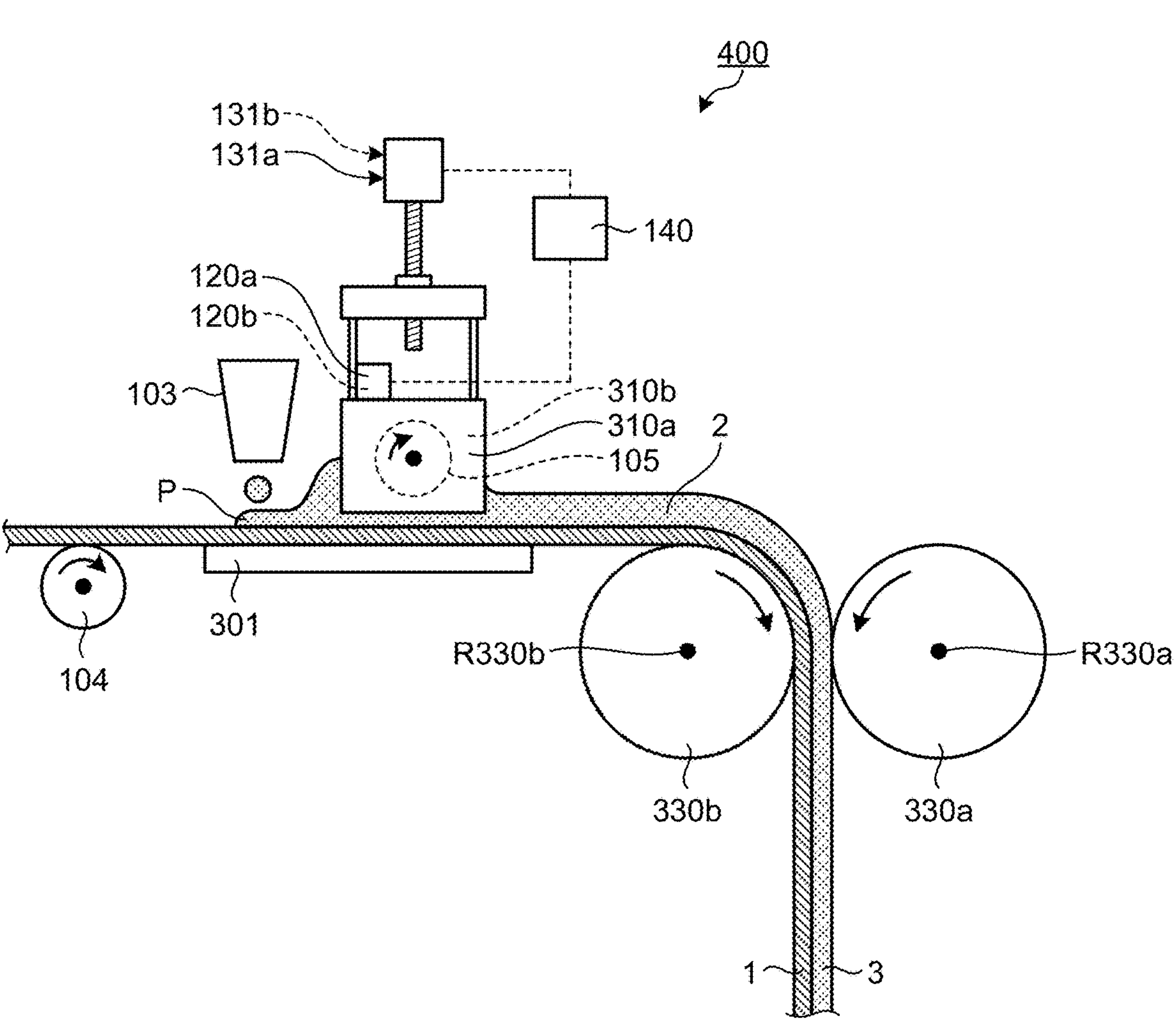
FIG. 14 is a schematic diagram illustrating a production apparatus according to a modification of the third embodiment.

FIG. 14 is a schematic diagram illustrating the production apparatus according to the modification of the third embodiment.

A production apparatus 400 includes the support unit 301 and the pair of rolling rolls 330*a* and 330*b*, which are disposed so that the plane including the rotation axis R330*a* of the rolling roll 330*a* and the rotation axis R330*b* of the rolling roll 330*b* is parallel to the plane including the main surface of the support unit 301.

Like the production apparatus 300, the production apparatus 400 reduces occurrence of distortion in the substrate 1 due to the contact of the first stock guide 310*a* and the second stock guide 310*b* with the substrate 1. The reduced distortion of the substrate 1 can suppress breakage of the substrate 1 and improve the production stability of the electrode active material layer 3.

REFERENCE SIGN LIST

1: substrate
2: granulated particle layer
3: electrode active material layer
P: granulated particles
100: production apparatus
101: forming roll (support unit, first conveying unit, or rolling unit)
R101: axis
DR101: direction
103: feeding unit
104: third conveying unit
105: squeegee roll (squeegee unit)
105E1: first end face
105E2: second end face
R105: axis
DR105: direction
110*a*: first stock guide
110*b*: second stock guide
W110: distance
111*a*: first surface
111*b*: second surface
112*a*: first end face
112*b*: second end face
113*a*: first slit (first through-hole)
113*b*: second slit (second through-hole)
120*a*: first position measurement unit
120*b*: second position measurement unit
130: rolling unit
130*a*: rolling roll
131*a*: first gap amount adjustment unit
131*b*: second gap amount adjustment unit
140: control unit
141: data acquisition unit
142: gap amount calculation unit
143: storage unit
144: gap amount adjustment amount determination unit
145: adjustment determination unit
146: gap amount adjustment instruction unit
150: distance prediction unit
151: data set acquisition unit
152: data set analysis unit
153: predicted distance data storage unit
201: forming roll
R201: axis
DR201: direction
202: second conveying unit
230: rolling unit
230*b*: rolling roll
R230*b*: axis
301: support unit
310*a*: first stock guide
310*b*: second stock guide
330*a*: rolling roll
330*b*: rolling roll
R330*a*: axes
R330*b*: axes
W310: distance
311*a*: first surface
311*b*: second surface
312*a*: first end face
312*b*: second end face
313*a*: first slit (first through-hole)
313*b*: second slit (second through-hole)

The invention claimed is:

1. A production apparatus of an electrode active material layer, comprising:

a support unit;

a feeding unit that feeds granulated particles on or above the support unit, the granulated particles containing an electrode active material and a binder;

a first conveying unit that conveys the granulated particles;

a squeegee unit that levels the granulated particles which are conveyed by the first conveying unit to form a granulated particle layer;

a first stock guide having a plate shape, the first stock guide having a first surface facing the support unit, the first stock guide being disposed in parallel with a first end face of the squeegee unit;

a second stock guide having a plate shape, the second stock guide having a second surface facing the support unit, the second stock guide being disposed in parallel with a second end face of the squeegee unit;

a rolling unit that rolls the granulated particle layer to form an electrode active material layer;

a first position measurement unit fixed to the first stock guide;

a second position measurement unit fixed to the second stock guide;

a first gap amount adjustment unit;

a second gap amount adjustment unit; and a control unit, wherein:

the first stock guide and the second stock guide are disposed so that a distance between a main surface of the first stock guide and a main surface of the second stock guide is equivalent to a width of the electrode active material layer;

the first position measurement unit is configured to measure a distance D1 between the first position measurement unit and a portion of a surface to which the granulated particles are fed by the feeding unit and that faces the first surface of the first stock guide;

the second position measurement unit is configured to measure a distance D2 between the second position measurement unit and a portion of the surface to which the granulated particles are fed by the feeding unit and that faces the second surface of the second stock guide;

the first gap amount adjustment unit is configured to adjust a gap amount G1 between the first surface of the first stock guide and the surface to which the granulated particles are fed;

the second gap amount adjustment unit is configured to adjust a gap amount G2 between the second surface of the second stock guide and the surface to which the granulated particles are fed;

the control unit causes the first gap amount adjustment unit to adjust the gap amount G1 based on a difference between the gap amount G1 determined based on the distance D1 and a gap amount threshold T1 of greater than 0 μm; and the control unit causes the second gap amount adjustment unit to adjust the gap amount G2 based on a difference between the gap amount G2 determined based on the distance D2 and a gap amount threshold T2 of greater than 0 μm.

2. The production apparatus of an electrode active material layer according to claim 1, wherein:

the first position measurement unit is fixed to a first end face of the first stock guide opposite to the first surface of the first stock guide;

the first stock guide has a first through-hole that runs therethrough from the first end face of the first stock guide, to which the first position measurement unit is fixed, to the first surface;

the first position measurement unit is configured to measure the distance D1 through the first through-hole;

the second position measurement unit is fixed to a second end face of the second stock guide opposite to the second surface of the second stock guide;

the second stock guide has a second through-hole that runs therethrough from the second end face of the second stock guide, to which the second position measurement unit is fixed, to the second surface; and the second position measurement unit is configured to measure the distance D2 through the second through-hole.

3. The production apparatus of an electrode active material layer according to claim 1, further comprising a second conveying unit that conveys a substrate to the rolling unit, wherein the rolling unit rolls the granulated particle layer overlaid on the conveyed substrate.

4. The production apparatus of an electrode active material layer according to claim 1, further comprising a second conveying unit that conveys a substrate to the support unit, the substrate comprising the surface to which the granulated particles are fed as a main surface thereof, wherein:

the support unit supports the substrate;

the feeding unit feeds the granulated particles on the substrate supported by the support unit;

the first position measurement unit is configured to measure the distance D1 between the first position measurement unit and a portion of the main surface of the substrate that faces the first surface of the first stock guide;

the second position measurement unit is configured to measure the distance D2 between the second position measurement unit and a portion of the main surface of the substrate that faces the second surface of the second stock guide;

the control unit obtains the gap amount G1 based on the distance D1 and causes the first gap amount adjustment unit to adjust the gap amount G1 based on a difference between the gap amount G1 and the gap amount threshold T1; and the control unit obtains the gap amount G2 based on the distance D2 and causes the second gap amount adjustment unit to adjust the gap amount G2 based on a difference between the gap amount G2 and the gap amount threshold T2.

5. The production apparatus of an electrode active material layer according to claim 1, wherein a single roll serves as the support unit and the first conveying unit.

6. The production apparatus of an electrode active material layer according to claim 1, wherein:

the support unit is a rotatable roll;

the control unit acquires a data set A1 on the distance DI during a period in which the support unit rotates two revolutions or more, analyzes the data set A1, predicts the distance D1, which varies depending on the rotation of the support unit, and causes the first gap amount adjustment unit to adjust the gap amount G1 based on the predicted distance D1; and the control unit acquires a data set A2 on the distance D2 during a period in which the support unit rotates two revolutions or more, analyzes the data set A2, predicts the distance D2, which varies depending on the rotation of the support unit, and causes the second gap amount adjustment unit to adjust the gap amount G2 based on the predicted distance D2.

* * * * *